(12) United States Patent
Furusho et al.

(10) Patent No.: US 7,546,896 B2
(45) Date of Patent: Jun. 16, 2009

(54) VEHICLE STEERING APPARATUS

(75) Inventors: Hiroyuki Furusho, Yokohama (JP); Masaaki Nawano, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 271 days.

(21) Appl. No.: 11/251,202

(22) Filed: Oct. 17, 2005

(65) Prior Publication Data

US 2006/0086560 A1 Apr. 27, 2006

(30) Foreign Application Priority Data

Oct. 27, 2004 (JP) ............................ 2004-311641
Aug. 5, 2005 (JP) ............................ 2005-227328

(51) Int. Cl.
*B62D 5/04* (2006.01)

(52) U.S. Cl. ........................................ 180/446; 701/42

(58) Field of Classification Search ................. 180/443, 180/446, 402; 701/41, 42
See application file for complete search history.

(56) References Cited

U.S. PATENT DOCUMENTS

| | | | | |
|---|---|---|---|---|
| 6,308,122 B1 * | 10/2001 | Nishizaki et al. | ............... | 701/41 |
| 6,415,212 B2 * | 7/2002 | Nishizaki et al. | ............... | 701/41 |
| 6,705,424 B2 * | 3/2004 | Ogawa et al. | ................ | 180/446 |
| 6,823,245 B2 * | 11/2004 | Sugitani et al. | ................ | 701/29 |
| 6,854,558 B2 * | 2/2005 | Pauly et al. | .................. | 180/446 |
| 7,031,813 B2 * | 4/2006 | Sugiyama et al. | ............. | 701/41 |

FOREIGN PATENT DOCUMENTS

| | | |
|---|---|---|
| JP | 9-142330 A | 6/1997 |
| JP | 2002-46638 A | 2/2002 |
| JP | 2003-81119 A | 3/2003 |

OTHER PUBLICATIONS

Masato Abe, "Steering System and Vehicle Motion", Vehicle Dynamics and Control, 1992, Chapter 5, Sankaidoo, Tokyo, Japan.

* cited by examiner

*Primary Examiner*—Kevin Hurley
(74) *Attorney, Agent, or Firm*—Foley & Lardner LLP

(57) ABSTRACT

A vehicle steering apparatus is comprised of an assist motor, a steering torque sensor, a steering angle sensor, and a controller. The controller has a torque producing section for estimating a virtual steering model input torque from a torque sensor detection value and a steering angle detection value, a virtual steering model of representing a desired steering characteristic which receives the virtual steering model input torque and outputs a target steering angle of a steering column shaft, and a steering angle servo for controlling an output of the assist motor so that the steering angle detection angle follows the target steering angle.

19 Claims, 18 Drawing Sheets

VEHICLE STEERING APPARATUS

BACKGROUND OF THE INVENTION

The present invention relates to a vehicle steering apparatus which comprises an actuator for applying an axial torque to a steering column shaft.

Japanese Published Patent Application No. 2003-81119 discloses an electric power-steering apparatus which is arranged to control an electric motor on the basis of a controlled variable which is a sum of a first controlled variable calculated from a steering torque detection value and a second controlled variable obtained based on a difference between a target motor turn angle calculated from the steering torque detection value and an actual motor turn angle, with intent to achieve both of ensuring a desired assist characteristic and an improvement of a steering feeling. This electric power-steering system is arranged such that the steering torque value includes a predetermined friction component, with intent to further improve the steering feeling by remaining a predetermined hysteresis characteristic between a steering torque and a steering-wheel angle.

SUMMARY OF THE INVENTION

However, this apparatus has a problem that it is difficult to always ensure a desired assist characteristic for reasons of a difficulty in firmly eliminating the influence of the dispersion among products although it is possible to suppress the dispersion due to electric motor or reduction gear.

That is, it is necessary to increase a feedback gain in order to decrease the influence of the dispersion due to the motor or reduction gear. However, if the feedback gain is increased, the assist control in the command to the electric motor is weaken. If the feedback gain is simply set at a large value, there will be caused a possibility that the control system diverges.

It is therefore an object of the present invention to provide a vehicle steering apparatus which is capable of achieving both of the improvement of the steering feeling and the decrease of the influence of the dispersion among products.

An aspect of the present invention resides in a vehicle steering apparatus which comprises: an actuator which applies an axial torque to a steering column shaft; a torque sensor which disposed on the steering column shaft between an input portion of the actuator and a steering wheel and detects a steering torque; a turn angle sensor which detects a turn angle of the steering column shaft; a steering-wheel side torque estimating section that estimates a steering-wheel side torque applied to the steering wheel from the detected steering torque and the detected turn angle; a steering model that represents a desired steering characteristic which receives the steering-wheel side torque as an input and outputs a target turn angle of the steering column shaft; and a position servo controlling section that controls an output of the actuator so that the detected turn angle of the steering column shaft follows the target turn angle.

Another aspect of the present invention resides in a method of controlling a vehicle steering apparatus which comprises an actuator for applying an axial torque to a steering column shaft. The method comprises an operation of detecting a steering torque on a steering column shaft between an input portion of the actuator and a steering wheel; an operation of detecting a turn angle of the steering column shaft; an operation of estimating a steering-wheel side torque applied to the steering wheel from the detected steering torque and the detected turn angle; an operation of obtaining a target turn angle of the steering column shaft by receiving the steering-wheel side torque and using a steering model; and an operation of controlling an output of the actuator so that the detected turn angle of the steering column shaft follows the target turn angle.

A further aspect of the present invention resides in a vehicle steering apparatus which comprises: actuating means for applying an axial torque to a steering column shaft; torque detecting means for detecting a steering torque on a steering column shaft between an input portion of the actuator and a steering wheel; turn angle detecting means for detecting a turn angle of the steering column shaft; steering-wheel side torque estimating means for estimating a steering-wheel side torque applied to the steering wheel from the detected steering torque and the detected turn angle; target turn angle obtaining means for obtaining a target turn angle of the steering column shaft by receiving the steering-wheel side torque and using a steering model; and controlling means for controlling an output of the actuator so that the detected turn angle of the steering column shaft follows the target turn angle.

A further aspect of the present invention resides in a vehicle which comprises a vehicle steering apparatus. The vehicle steering apparatus comprises: an actuator which applies an axial torque to a steering column shaft; a torque sensor which disposed on the steering column shaft between an input portion of the actuator and a steering wheel and detects a steering torque; a turn angle sensor which detects a turn angle of the steering column shaft; a steering-wheel side torque estimating section that estimates a steering-wheel side torque applied to the steering wheel from the detected steering torque and the detected turn angle; a steering model that represents a desired steering characteristic which receives the steering-wheel side torque as an input and outputs a target turn angle of the steering column shaft; and a position servo controlling section that controls an output of the actuator so that the detected turn angle of the steering column shaft follows the target turn angle.

The other objects and features of this invention will become understood from the following description with reference to the accompanying drawings.

DETAILED DESCRIPTION OF THE INVENTION

There is discussed the best mode of achieving a vehicle steering apparatus according to the present invention, on the basis of first through third embodiments.

First Embodiment

The first embodiment exemplifies an application of the vehicle steering apparatus of the present invention to an electric power-steering system.

Figure 1:
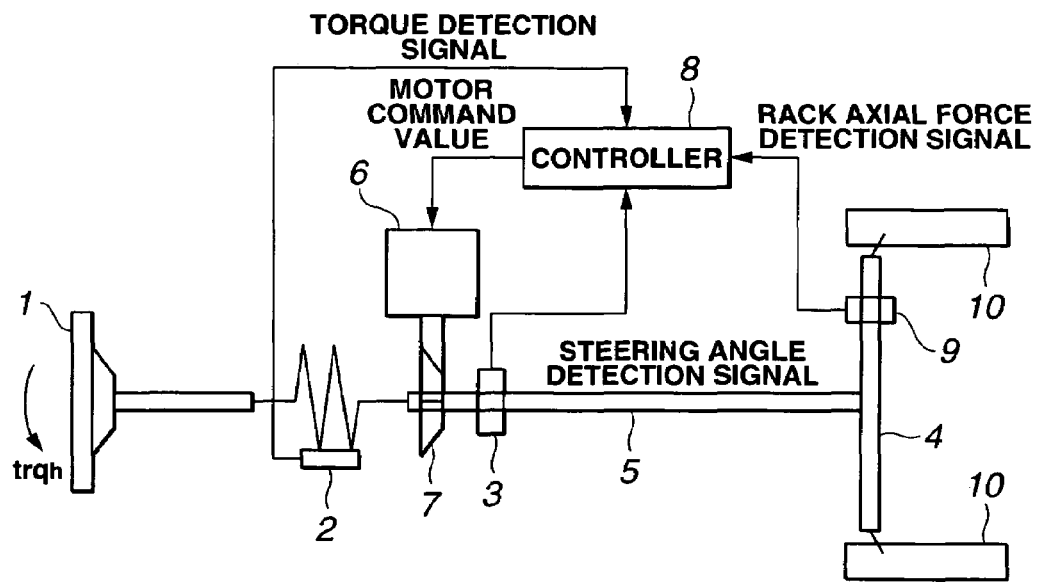
FIG. 1 is a structural view showing an electric power-steering system which employs a vehicle steering apparatus according to a first embodiment of the present invention.

FIG. 1 is a schematic view showing the electric power steering system according to the first embodiment of the present invention. The electric power steering system comprises a steering wheel 1, a steering torque sensor 2, a steering angle sensor (turn angle sensor) 3, a steering rack (steering mechanism) 4, a column shaft (steering column shaft) 5, an assist motor (actuator) 6, a reduction gear 7, a controller 8, a rack axial force sensor 9, and steered wheels 10 and 10.

Steering torque sensor 2 is disposed on steering column shaft 5 between assist motor 6 and steering wheel 1. Steering torque sensor 2 detects a torsion of a torsion bar, which is produced by a driver's steering torque, and outputs the detected torsion to controller 8. Steering angle sensor 3 detects a turn angle (steering angle) of steering column shaft 5, which is located at a portion near the steered wheels 10 and 10 as compared with the position of the steering torque sensor 2, and outputs the detected steering angle to controller 8. Since a torsion bar exists between steering wheel 1 and steering angle sensor 3, the turn angle of steering wheel 1 becomes different from the turn angle of steering column shaft 5.

Steering mechanism (steering rack) 4 steers steered wheels 10 by converting the rotation of steering column shaft 5 into a vehicle lateral movement. Rack axial force sensor 9 detects an axial force applied to rack 4 and outputs the detected rack axial force to controller 8.

A brushless DC motor is employed as assist motor 6 in the first embodiment. A motor output shaft of assist motor 6 is connected to steering column shaft 5 through reduction gear 7 and outputs an assist torque of assisting the driver's steering torque to steering column shaft 5.

Controller 8 controls a motor command value of assist motor 6 on the basis of the steering torque detection value outputted from steering torque sensor 2, the steering angle detection value outputted from steering angle sensor 3, and the rack axial force detection value outputted from rack axial force sensor 9.

Figure 2:
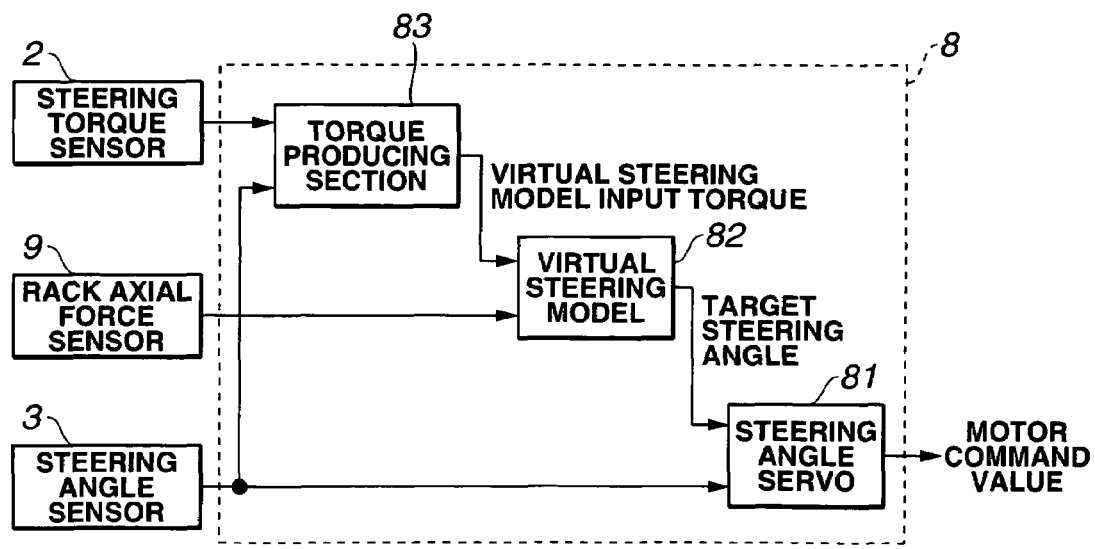
FIG. 2 is a control block diagram of a controller of the first embodiment.

FIG. 2 shows a control block diagram of controller 8. Controller 8 is basically constructed by a steering angle servo (position servo controlling means) 81 for calculating a command value to assist motor 6 so that the steering angle follows a target steering angle (target turn angle), a virtual steering model 82 for calculating the target steering angle, and a torque producing section (steering-wheel-side torque estimating means) 83 for calculating a virtual steering model input torque (steering-wheel side torque).

First, there is discussed the steering angle servo 81. Steering angle servo 81 calculates the motor command value of assist motor 6 so that the steering angle detection value (actual steering angle) follows the target steering angle which is an output of virtual steering model 82. The obtained motor command value is outputted to a not-shown current drive circuit, and current corresponding to the motor command value is supplied to assist motor 6 trough the current drive circuit.

Figure 3:
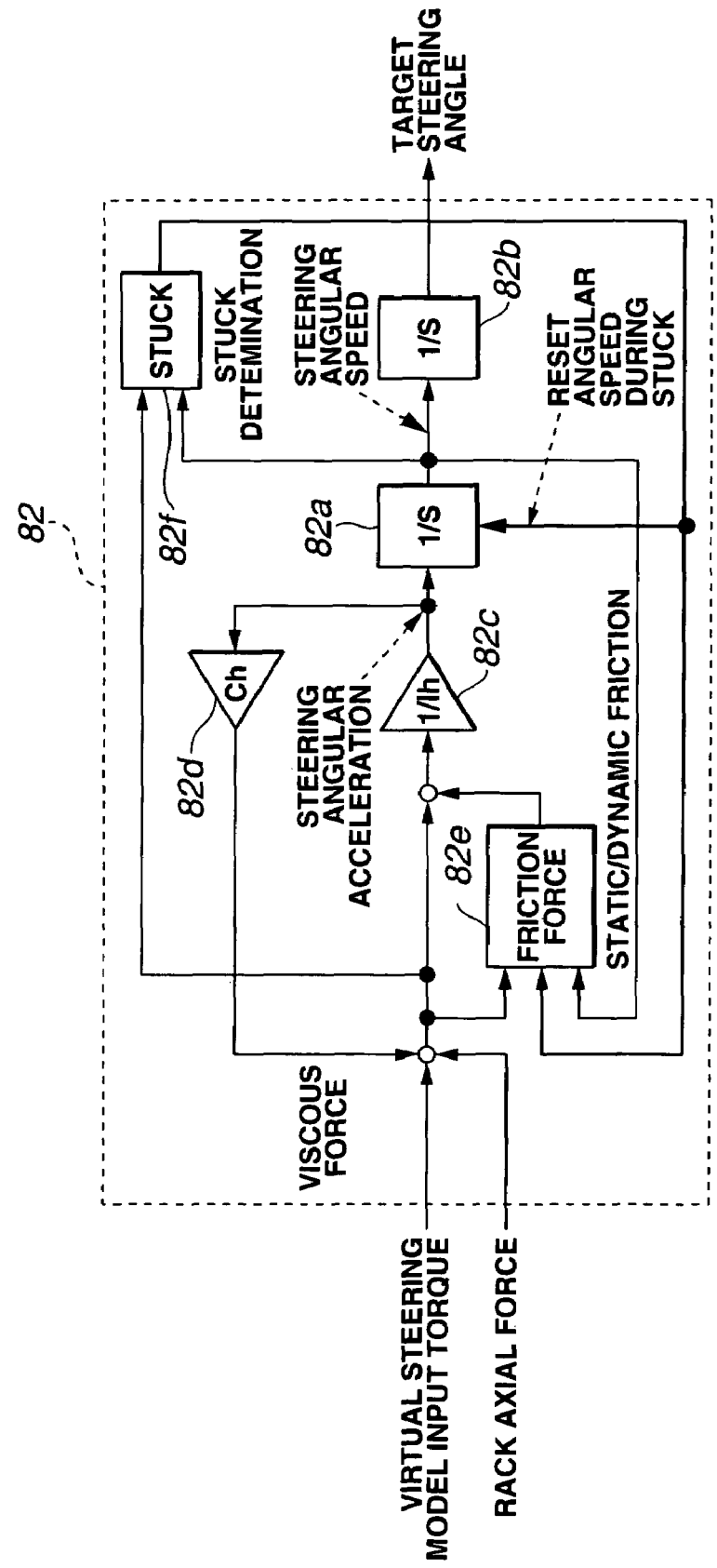
FIG. 3 is a control block diagram of a virtual steering model of the first embodiment.

Subsequently there is discussed the virtual steering model 82. Virtual steering model 82 has stored a desired steering characteristic. FIG. 3 shows the steering characteristic of virtual steering model 82. Herein, the dynamic characteristic of the model is expressed by a continuous-time system, integrators 82a and 82b are represented by 1/s wherein s is a Laplace operator. In order to facilitate the understanding of the system, the torque and the steering angle are converted into values relative to the steering column shaft.

A multiplier 82c outputs a value obtained by multiplying the input by an inverse number 1/Ih of a desired steering inertia Ih. A multiplier 82d multiplies the input by Ch to set a desired steering viscosity. A multiplier 82e reproduces a desired static/dynamic friction. A multiplier reproduces a state that motion of steering wheel 1 is stopped by a static friction, and functions to set a steering angular speed in the virtual model.

With this arrangement, it becomes possible that a driver can sense the motion of the virtual steering model through a reaction force and a behavior of the steering angle during the steering state. By storing a desired steering characteristic in the virtual steering model, it becomes possible to experience a desired steering feeling.

Figure 4:
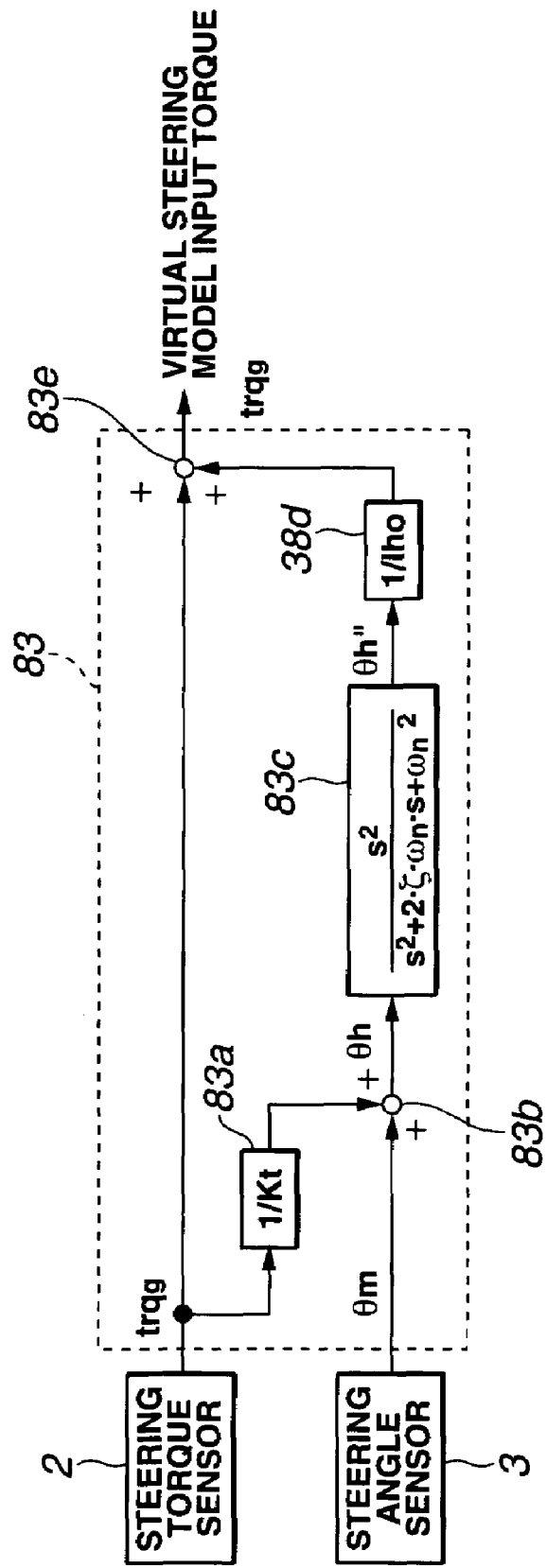
FIG. 4 is a control block diagram of a torque producing section of the first embodiment.

Subsequently, there is discussed the torque producing section 83 for calculating the virtual steering model input torque. FIG. 4 shows the torque producing section 83 of the first embodiment. The torque producing section 83 comprises a multiplier 83a, an adder 83b, a multiplier 83c, a multiplier 83d and an adder 83e.

Multiplier 83a obtains a torsional angle $trq_h/Kt$ by multiplying steering torque detection value $trq_h$ by an inverse number $1/Kt$ of a torsional rigidity Kt of the steering torque sensor 2, and outputs the obtained torsional angle to adder 83b.

Adder 83b obtains a steering-wheel angle θh by multiplying steering angle detection value θm by torsional angle $trq_h/Kt$ outputted from multiplier 83a, and outputs the obtained steering-wheel angle θh to multiplier 83c.

Multiplier 83c obtains a steering-wheel angular acceleration θh" by multiplying steering-wheel angle θh by a transfer function $S^2/(s^2+2\zeta\omega_n s+\omega_n^2)$, which approximately expresses a second-order differential, and outputs the obtained steering-wheel angular acceleration θh" to multiplier 83d.

Multiplier 83d multiplies steering-wheel angular acceleration θh" outputted from multiplier 83c by an inverse number $1/Ih_0$ of inertial $Ih_0$, and outputs the obtained product to adder 83e.

Adder 83e obtains the sum of the virtual steering model input torque $trq_h$ and the output $θh"×1/Ih_0$ of multiplier 83d as a virtual steering model input $trq_g$, and outputs the obtained value to virtual steering model 82.

That is, torque producing section 83 outputs the sum of steering torque detection value $trq_h$ and the torque $Ih_0×θh"$ corresponding to the steering-wheel acceleration as virtual steering model input $trq_g$. The steering-wheel acceleration is the product of steering-wheel inertia $Ih_0$ and steering-wheel angular acceleration θh".

Subsequently, there is discussed the operation of the first embodiment according to the present invention.

[Calculation of Virtual Steering Model Input Torque]

There is discussed a calculation method of the virtual steering model input torque.

The following expression (1) shows a calculation method of the steering angle employed in the first embodiment. The torsional angle is calculated by dividing the steering torque detection value by the torsional rigidity of the steering torque sensor 2. The steering-wheel angle is obtained by adding the obtained torsional angle and the steering angle.

$$θh=θm+trq_h/Kt \quad (1)$$

wherein θh is the steering-wheel angle and θm is the steering angle. In the first embodiment, the steering angle represents a turn angle at a portion of the column shaft.

Subsequently, the steering-wheel angular acceleration is obtained by executing a second-order differential of the steering-wheel angle θh obtained from the expression (1). The second-order differential may be approximated by a transfer function expressed by the following expression (2).

$$θh"=θh×S^2/(s^2+2\zeta\omega_n s+\omega_n^2) \quad (2)$$

As an example, there is shown a pattern that ζ is 0.9, and $\omega_n$ is 2×π×60. These parameters relates to a noise cancellation of the high frequency, and the signal having an angle frequency higher than $\omega_n$ is eliminated. If the parameter $\omega_n$ is set at a value smaller than the above set value, there is caused a possibility that the steering feeling is degraded. Therefore, it necessary to set the parameters ζ and $\omega_n$ taking account of a tradeoff relationship therebetween.

The virtual steering model input torque is therefore expressed by the following expression (3).

$$trq_g=trq_h+Ih_0×θh" \quad (3)$$

wherein $trq_g$ is the virtual steering model input torque (or steering wheel side torque), $trq_h$ is a steering torque detection value (or detected steering torque), $Ih_0$ is an inertia of steering wheel 1 which is actually installed in the vehicle. $Ih_0×θh"$ is an additional steering torque, which is calculated at least in accordance with steering angle detection value (or detected turn angle) θm as discussed above.

[Steering Angle Servo Control]

Figure 5:
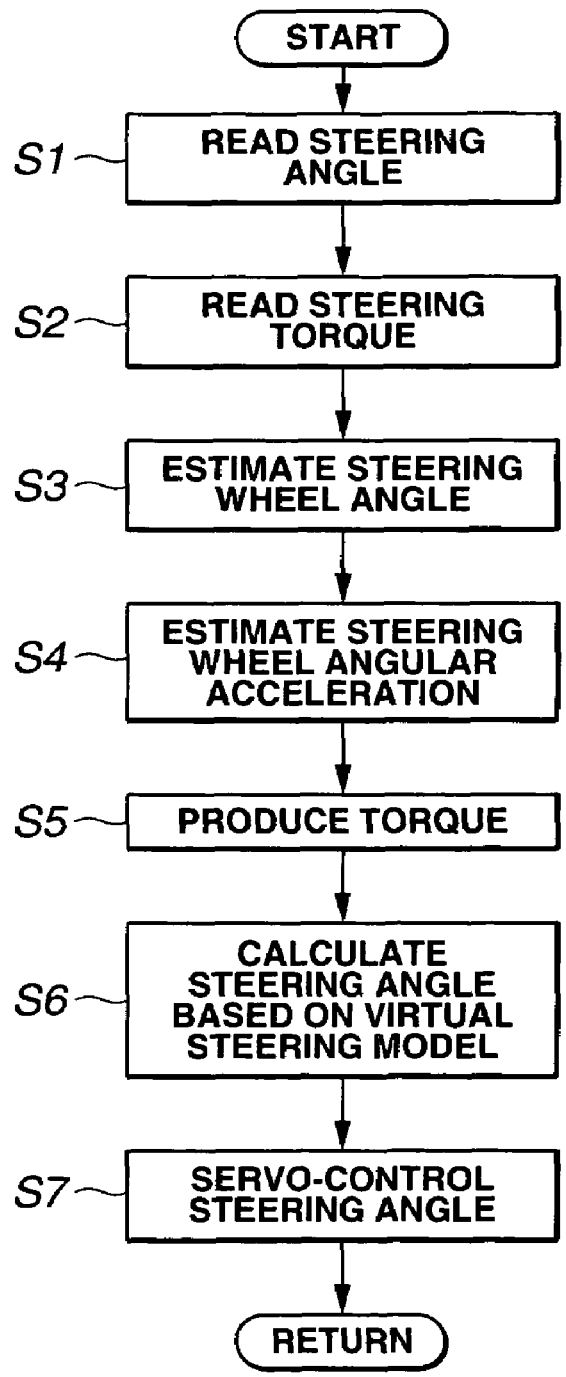
FIG. 5 is a flowchart showing a steering angle servo control executed by the controller of the first embodiment.

FIG. 5 is a flowchart showing the steering angle servo control executed by controller 8. Hereinafter there is discussed each step in the flowchart. This control is executed at predetermined cycles.

At step S1 torque producing section 83 reads steering angle θm from steering sensor 3.

At step S2 subsequent to step S1, torque producing section 83 reads steering torque $trq_h$ from steering torque sensor 2.

At step S3 subsequent to step S2, torque producing section 83 estimates steering-wheel angle θh using the expression (1).

At step S4 subsequent to step S3, torque producing section 83 estimates steering-wheel angular acceleration θh" using the expression (2).

At step S5 subsequent to step S4, torque producing section 83 produces virtual steering model torque input $trq_g$ using the expression (3).

At step S6 subsequent to step S5, virtual steering model 82 executes a target steering angle calculation of the virtual steering model, based on the virtual steering model input torque $trq_g$ produced at step S5 and the rack axial force read from rack axial force sensor 9.

At step S7, steering angle servo 81 executes a steering angle servo control for bringing the actual steering angle to the target steering angle. Then, the routine returns to a start block.

[Problem of Steering Torque Feedback Loop]

An electric power steering apparatus disclosed in Japanese Published Patent Application No. 2003-81119 is invented to solve the problem that a desired steering feel is avoided by an inertia of parts of the apparatus, a dispersion among frictions in a reduction gear disposed in an electric motor or between the electric motor and a steering shaft.

This conventional electric power steering apparatus comprises an assist controlling section of obtaining a first controlled variable by multiplying a steering-wheel steering torque by a gain; a steering-speed feedback controlling section for determining a second controlled variable on the basis of a difference between a target motor revolution speed (output of Gv(s)) calculated from the steering-wheel steering torque and an actual motor revolution speed; and a motor controlling section for controlling an electric motor using a controlled variable obtained by executing the adding or subtracting between the first and second controlled variable. Further, this conventional apparatus has proposed that a predetermined friction component (output of KF) is included in a steering-wheel steering torque detection value of an input of the steering angular speed feedback controlling section, so as to intently apply a hysteresis characteristic to a steering reaction force.

However, the conventional apparatus has a problem that it is impossible to completely eliminate the dispersion although it is possible to decrease the dispersion in some degree. Hereinafter, there is discussed reasons thereof.

Figure 6:
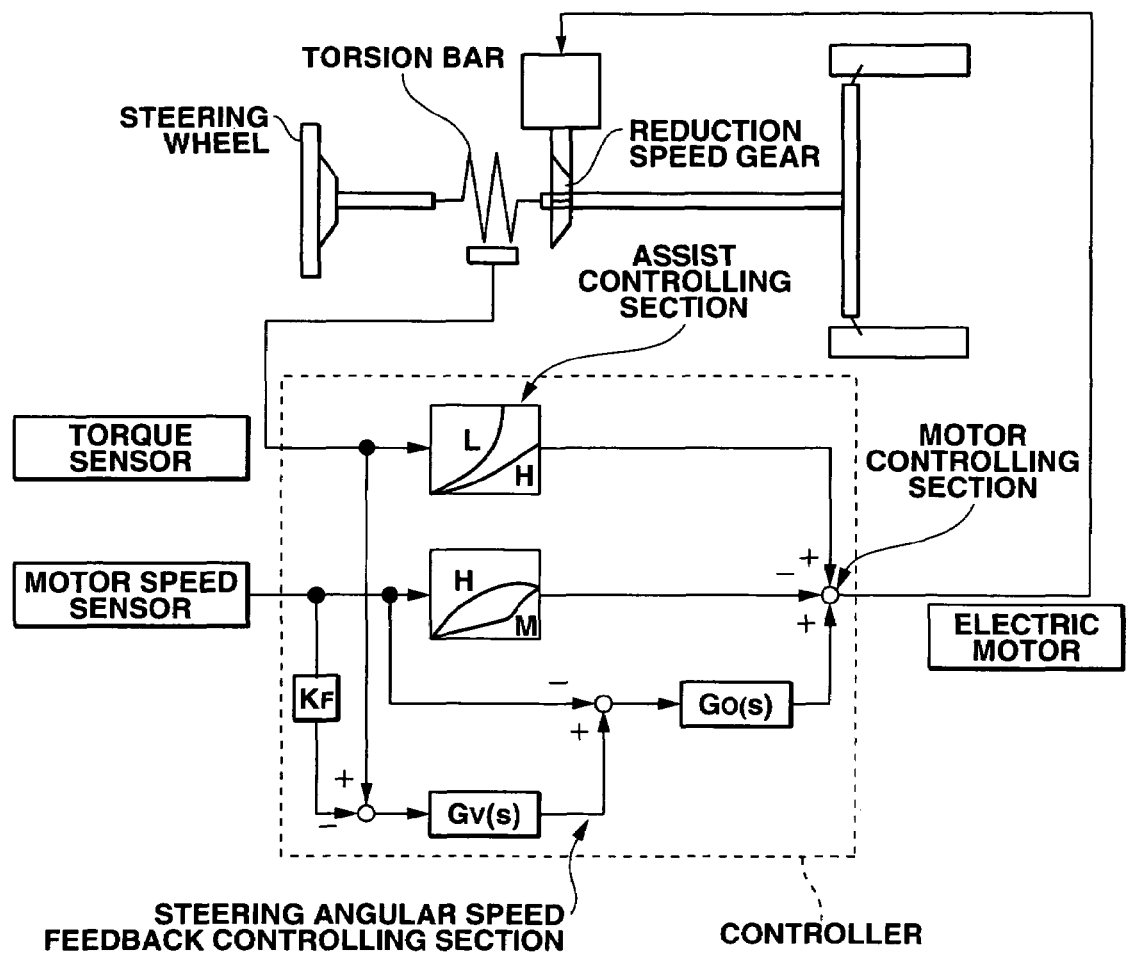
FIG. 6 is a block diagraph showing a comparative steering apparatus.

In order to decrease the influence caused by the dispersion of the electric motor and the reduction gear, it is necessary to increase a feedback gain as commonly discussed in the system control theory. In FIG. 6, a steady term of Gv(s) or Go(s) corresponds to the feedback gain. If the gain is increased, an assist control relative to the command to the electric motor is weakened, and the construction of this control loses its meaning. If the gain is simply set at a large value, there is caused a possibility that the control system is put in a divergent state. As shown in FIG. 6, as a result of the revolution of the electric motor, a torsion bar constructing the steering torque sensor is twisted. That is, the control system constructs a loop. The prior art of the conventional apparatus has not taken account of the stability of the control system, and therefore it is impossible that such a construction of the convention apparatus cannot increase the feedback gain.

Although this feedback functions to decrease the dispersion of products including the dispersion of frictions, the function thereof is restrictive.

[Steering Angle Servo Control using Steering Model]

In contrast to the above conventional apparatus, the electric power steering system of the first embodiment according to the present invention executes the following operations when a driver steers steering wheel 1.

(a) Steering torque $trq_h$ is inputted.

(b) Virtual steering model input torque $trq_g$ changed according to the input of steering torque $trq_h$, and target steering angle θm* also changes. For example, when the steering torque is applied in the left-turn direction., the virtual steering model turns left, and the rotation angle, that is, the target steering angle θm* is shifted to the left side.

(c) Assist motor 6 is driven so as to bring the actual steering angle closer to target steering angle θm*.

(d) Processing returns to step (a).

Figure 7:
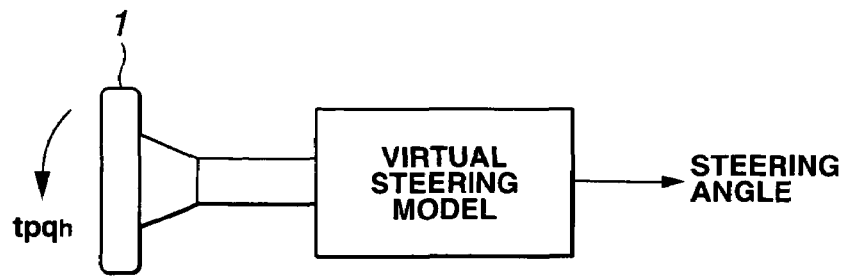
FIG. 7 is a schematic view showing a virtual steering model of the first embodiment.

In case that the whole control system is a system that the driver's steering torque is an input, which is different from the torque detecting by steering sensor 2, and the steering angle (turn angle) of steering column shaft 5 at a portion between steering torque sensor 2 and rack (steering mechanism) 4, the system gradually approaches a system shown in FIG. 7 as the following performance of the steering angle servo. The reason thereof is discussed hereinafter.

It is apparent that the input of virtual steering model 82 is the approximation of the driver's steering torque. That is, the driver's torque is the sum of the torsional torque of steering torque sensor 2 and a torque of acceleratingly steering the steering wheel 1. If the viscosity and the other characteristics of the portion between steering wheel 1 and steering torque sensor 2 have been known, the input of the system may be constructed taking account of these characteristics.

In case that the following performance is improved, the target steering angle θm*, which is an output of virtual steering model 82, almost corresponds to actual steering angle θh. That is, the system of FIG. 1 gradually approaches the system shown in FIG. 7.

By improving the following performance, it becomes possible to suppressing the dispersion of the hardware of the steering system. For example, in case that there is existed the friction in the system, it becomes possible to eliminate the influence of the friction by the improvement of the following performance. That is, as commonly proved by the system control theory, it is apparent that the dispersion among the controlled objects by improving the following performance, that is by increasing the feedback gain.

That is, by providing an ideal model in virtual steering model 82, the driver can obtain the ideal steering feeling. Further, by providing a desired static/dynamic friction suitable in the ideal model, it becomes possible to intently obtain the desired static/dynamic friction. For example, although the conventional apparatus has had the dispersion of the frictions in products, by employing this concept, it becomes possible to realize the desired performance (steering feeling) with a predetermined accuracy.

The final point is that ensuring the stability is obtained by paying attention to the steering servo system. There is discussed a reason that it is not necessary to pay attention to the stability in describing the virtual model. When a new loop is added in the control system in addition to the steering servo system, the stability of the control system is lost. However, the input of the virtual steering model 82 is only a driver's torque inputted by a driver through steering wheel 1. This input is determined by the driver's intention and is not a quantity changed by the servo control. Therefore, the stability is maintained.

If the value of the steering torque sensor 2 is simply used as an input of the virtual steering model 82, a feedback loop is produced by the signal of the steering torque sensor 2, and the control system is diverged. That is, when assist motor 6 is driven according to the flow of the control and steering angle θm is changed thereby, steering wheel 1 and steering column shaft 5 are twisted. This operation changes the steering torque sensor detection value $trq_h$. Accordingly, the input of the control system is influenced thereby, and the control system is diverged thereby.

Subsequently, there is discussed the effects of the electric power steering system according to the first embodiment of the present invention.

(1) Since the electric power steering system of the first embodiment is arranged to comprise the assist motor 6 for applying an assist torque to steering column shaft 5, the steering torque sensor 2 disposed between the motor input portion of steering column shaft 5 and steering wheel 1, the steering angle sensor for detecting a steered angle (turn angle) of steering column shaft 5, the torque producing section 83 for estimating the virtual steering model input torque $trq_g$ from the torque sensor detection valve $trq_h$ and steering angel sensor detection value θm, the virtual steering model 82 of representing the desired steering characteristic by which target steering angle θm* of steering column shaft 5 is outputted, and the steering angle servo 81 for controlling the output of assist motor 6 so that the steering angle (steering angle sensor detection value θm) of steering column shaft 5 follows target steering angle θm*, it becomes possible to always ensure the desired steering characteristic without being influenced by the dispersion among products and to achieve both of the improvement of the steering feeling and the suppression of the dispersion among products.

(2) The torque producing section 83 obtains the steering wheel angle θh which is the sum of the torque sensor detection value $trq_h$ and the torsional angle estimated from the steering angle sensor detection value θm, and obtains the sum of the torque sensor $trq_h$ and the product of the second-order differential of steering-wheel angle θh and the inertial $I_{ho}$ of steering wheel 1, as the virtual steering model input torque $trq_g$. Therefore, it becomes possible to calculate the virtual steering model input torque $trq_g$ while taking account of a steering torque consumed for acceleratingly the steering wheel 1, and to further accurately approximate the driver's steering torque.

(3) Since virtual steering model 82 receives the rack axial force, which is an external input applied to steering column shaft 5, as input, in addition to virtual steering model input torque $trq_g$, it becomes possible to suitably set target steering angle θm* based on the road surface condition and to obtain the desired steering feeling.

(4) Since virtual steering model 82 outputs the target steering angle θm* based on the steering inertia Ih, the steering viscosity Ch, and the static/dynamic friction of steering wheel 1, it becomes possible to always set the suitable target steering angle θm* regardless of the dispersion of inertia or friction among products and to obtain the desired steering characteristic.

(5) Since steering column shaft 5 is mechanically connected to rack 4 for steering the steered wheels 10 and assist motor 6 assists the driver's steering force, it becomes possible to ensure the accurate and stable power-assist characteristic.

Second Embodiment

There is discussed the construction of the electric power steering system according to the second embodiment of the present invention.

Figure 8:
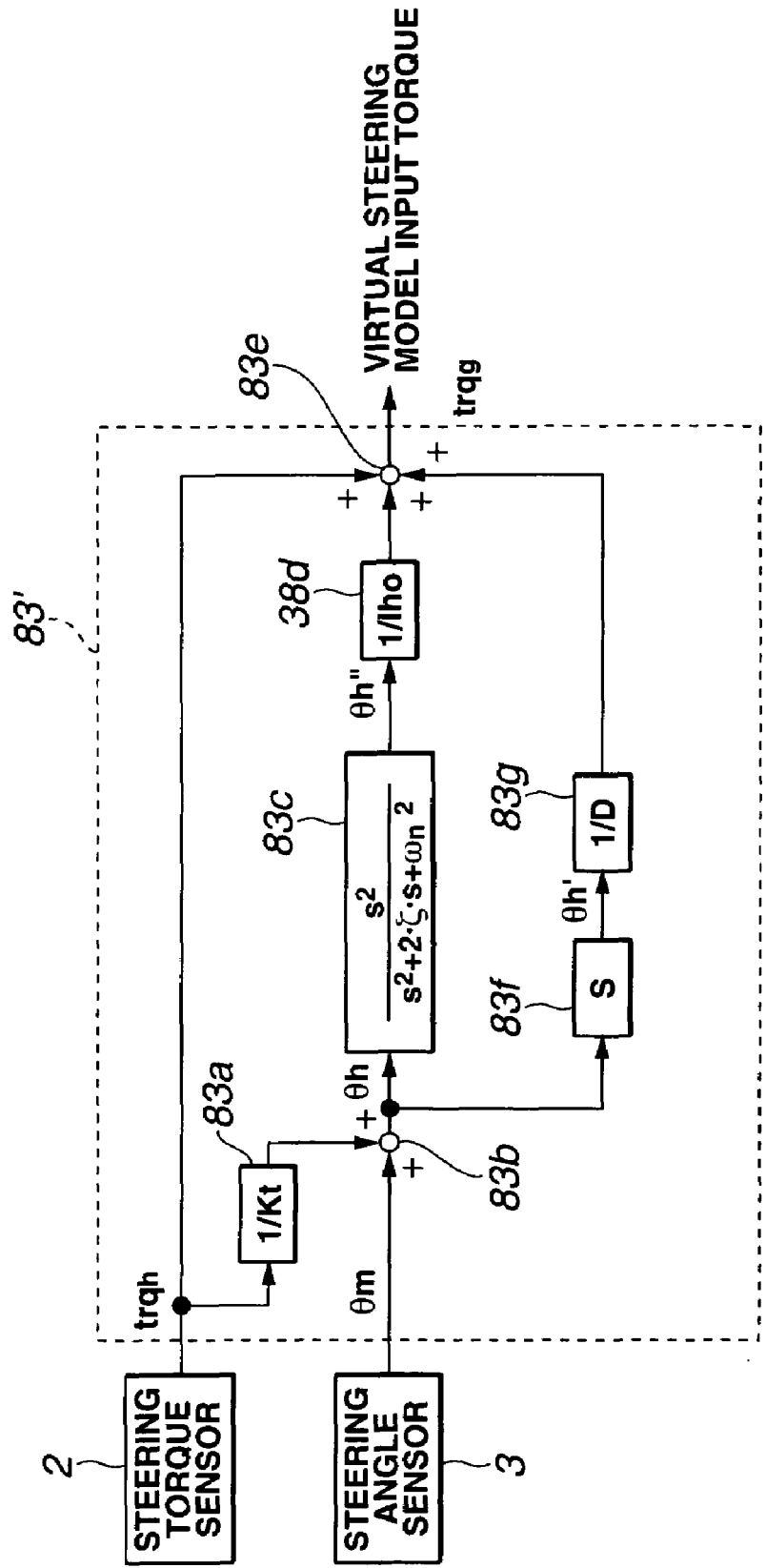
FIG. 8 is a control block diagram of a torque producing section of a second embodiment.

FIG. 8 is a control block diagram showing the torque producing section of the second embodiment. The torque producing section 83' of the second embodiment further includes a differentiator 83f and a multiplier 83g, in addition to the construction of the torque producing section of the first embodiment. Since the other constructions of the second embodiment are the same as those of the first embodiment, the parts as same as those of the first embodiment are denoted by the same reference numerals and the explanation thereof is omitted herein.

Differentiator 83f obtains a first-order differential of steering-wheel angle θh received from adder 83b as a steering-wheel angular speed θh' and outputs it to multiplier 83g.

Multiplier 83g obtains the product θh'×D by multiplying the steering-wheel angular speed θh' by an inverse value 1/D of the damping coefficient of steering torque sensor 2 and outputs the obtained product θh'×D to adder 83e.

Adder 83e obtains the sum of steering torque sensor detection value $trq_h$, the output θh"×1/Iho of a multiplier 38d and the output θh'×D of multiplier 83g, as virtual steering model input torque $trq_g$.

That is, in the second embodiment, torque producing section 83' obtains the virtual steering model input torque from the following expression (4).

$$trq_g = trq_h + D \times \theta h' + Ih_0 \times \theta h'' \quad (4)$$

wherein $trq_g$ is the virtual steering model input torque, $trq_h$ is the steering torque sensor detection valve, D is the torque damping coefficient of torque sensor 2, and $Ih_0$ is the inertia of steering wheel 1 of the vehicle. In this embodiment, the term D+θh'and/or the term $Ih_0 \times \theta h''$ is an additional steering torque.

Therefore, the second embodiment is arranged to calculate the virtual steering model input torque $trq_g$ while taking account of the torque corresponding to a quantity consumed as the torsion of the steering torque sensor 2 in addition to the torque corresponding to a quantity consumed as the acceleration of steering wheel 1.

Subsequently, there is discussed the effects of the second embodiment. The electric power steering system of the second embodiment obtains the following effect (6) in addition to the effects (1), (3), (4) and (5) of the first embodiment.

(6) Since steering torque producing section 83' obtains steering-wheel angle θh which is the sum of the torque sensor detection value $trq_h$ and the torsion angle estimated from the steering angle detection value and further sets the sum of the torque sensor detection value $trq_h$, the product of the first-order differential θh' of steering-wheel angle θh and the torsion damping coefficient D of steering torque sensor 2, and the product of the second-order differential θh" of steering-wheel angle θh and the inertia Iho of steering wheel 1, as the virtual steering model input torque $trq_g$, it becomes possible to calculate the virtual steering model input torque $trq_g$ while taking account of the torque corresponding to the quantity consumed as the torsion of torque sensor 2 in addition to the torque corresponding to the quantity consumed as the acceleration of steering wheel 1 and to further accurately approximate the driver's steering torque.

Third Embodiment

A third embodiment shows a steer-by-wire system to which the vehicle steering apparatus of the present invention is applied.

Figure 9:
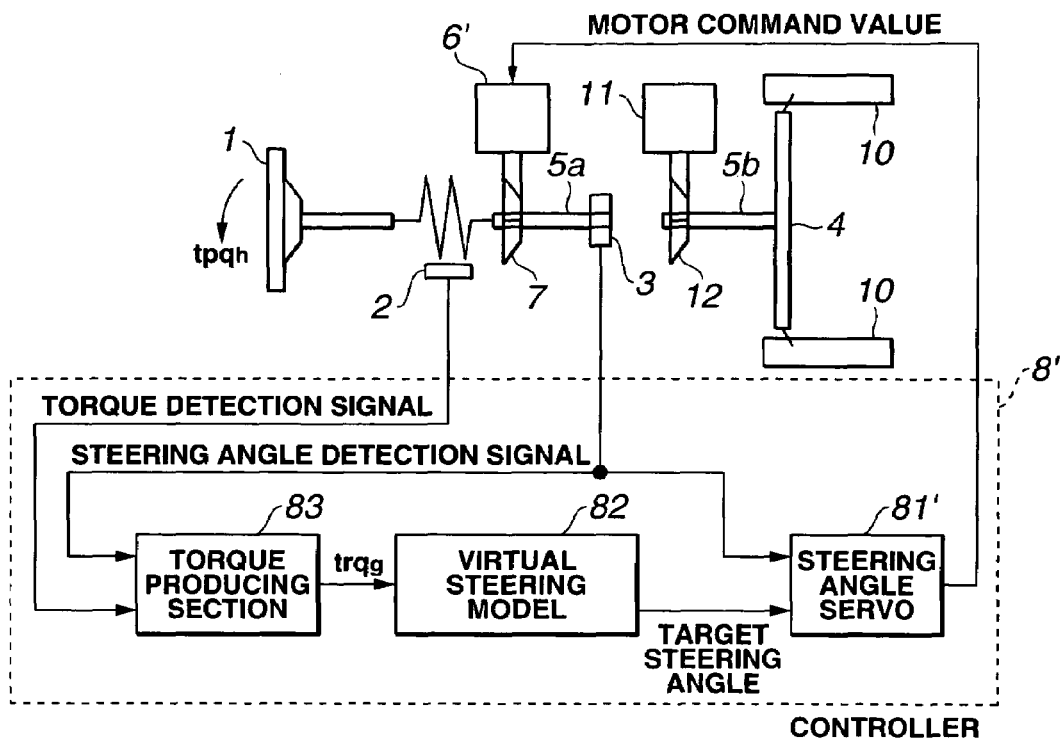
FIG. 9 is a structural view showing a steer-by-wire system of a third embodiment.

FIG. 9 is a structural view showing the steer-by-wire system according to the third embodiment of the present invention. The steer-by-wire system comprises steering wheel 1, steering torque sensor 2, steering angle sensor (turn angle sensor) 3, rack (steering mechanism) 4, steering column shaft 5a, a pinion shaft 5b, a reaction force motor (actuator) 6', a reduction gear 7, a controller 8', steered wheels 10, a tire steering motor 11 and a reduction gear 12.

The steer-by-wire system of the third embodiment has a construction that steering column shaft 5 connected to steering wheel 1 is mechanically separated from pinion shaft 5b connected to steered wheels 10 and is arranged to steer the steered wheels 10 by controlling the tire steering motor 11 according to the steering angle and the steering torque. Herein, the explanation of a control of controlling tire steering motor 11 is omitted herein.

Reaction force motor 6' outputs a steering reaction force for simulating the road surface input according to the state of steered wheels 10, relative to column shaft 5a.

Controller 8' controls the motor command value of reaction force motor 6' on the basis of the steering torque detection value detected by steering torque sensor 2 and the steering angle detection value detected by steering angle sensor 3.

The construction of controller 8' is the same as that of controller 8 of the first embodiment, except that the motor command value which is the output of the steering servo 81' is inversed in the positive and negative polarity relative to the value of the first embodiment and that the rack axial force is obtained from a relationship between the steering angle and the vehicle speed by previously preparing a two-wheel mode which is represented by a vehicle characteristic, instead of the rack axial force sensor. The two-wheel model has been designed with reference to a book: Masato Abe, "Steering System and Vehicle Motion" in Chapter 5, *Vehicle Dynamics and Control*, Sankaidoo, Tokyo in Japan, 1992.

Figure 10:
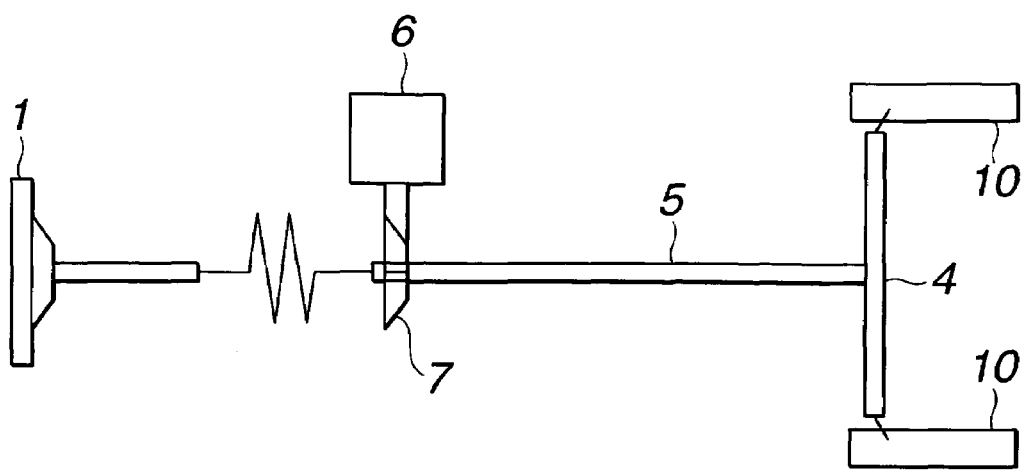
FIG. 10 is a schematic view showing a design object of a steering angle which is applied to an electric power-steering.
Figure 11:
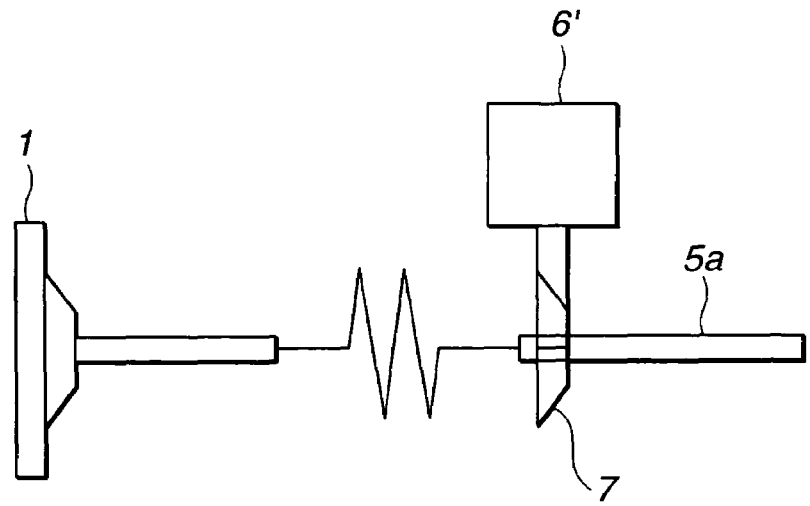
FIG. 11 is a schematic view showing a design object of the steering angle which is applied to a steer-by-wire system.

That is, the control system of the steer-by-wire system of the third embodiment is only different from that of the first embodiment in the design object of the steering angle servo system. FIG. 10 shows the design object in case of a general electric power steering system represented in the first embodiment. FIG. 11 shows the design object of the steer-by-wire system of the third embodiment. Since the steer-by-wire system employs a structure that the steering column shaft is divided into two parts as shown in FIG. 11, it is not necessary to take account of the steered wheel side mechanism including the tire side column shaft (pinion shaft) 5b and rack 4 and steered wheels 10.

Subsequently, there is discussed the effects of the third embodiment. The steer-by-wire system of the third embodiment obtains the following effect in addition to the effects (1) through (4) of the first embodiment.

(7) Since the steer-by-wire system of the third embodiment is arranged to comprise the reaction force motor 6' for applying the reaction torque to steering column shaft 5a, the steering torque sensor 2 disposed between the motor input portion of steering column shaft 5a and steering wheel 1, the steering angle sensor 3 for detecting the steered angle (turn angle) of steering column shaft 5a, the torque producing section 83 for estimating the virtual steering model input torque $trq_g$ from the torque sensor detection valve $trq_h$ and steering angle sensor detection value $θm$, the virtual steering model 82 of representing the desired steering characteristic by which target steering angle $θm^*$ of steering column shaft 5a is outputted, and the steering angle servo 81 for controlling the output of reaction force motor 6' so that the steering angle (steering angle sensor detection value $θm$) of column shaft 5 follows target steering angle $θm^*$, it becomes possible to always ensure the desired steering characteristic without being influenced by the dispersion among products and to achieve both of the improvement of the steering feeling and the suppression of the dispersion among products.

(8) Since steering column shaft 5a is mechanically separated from rack 4 of steering the steered wheels 10 and reaction force motor 6' outputs a steering reaction force representing a simulated road input, it becomes possible to obtain the desired reaction force control without being influenced by the dispersion of products.

Fourth Embodiment

There is discussed the construction of the fourth embodiment according to the present invention.

Figure 12:
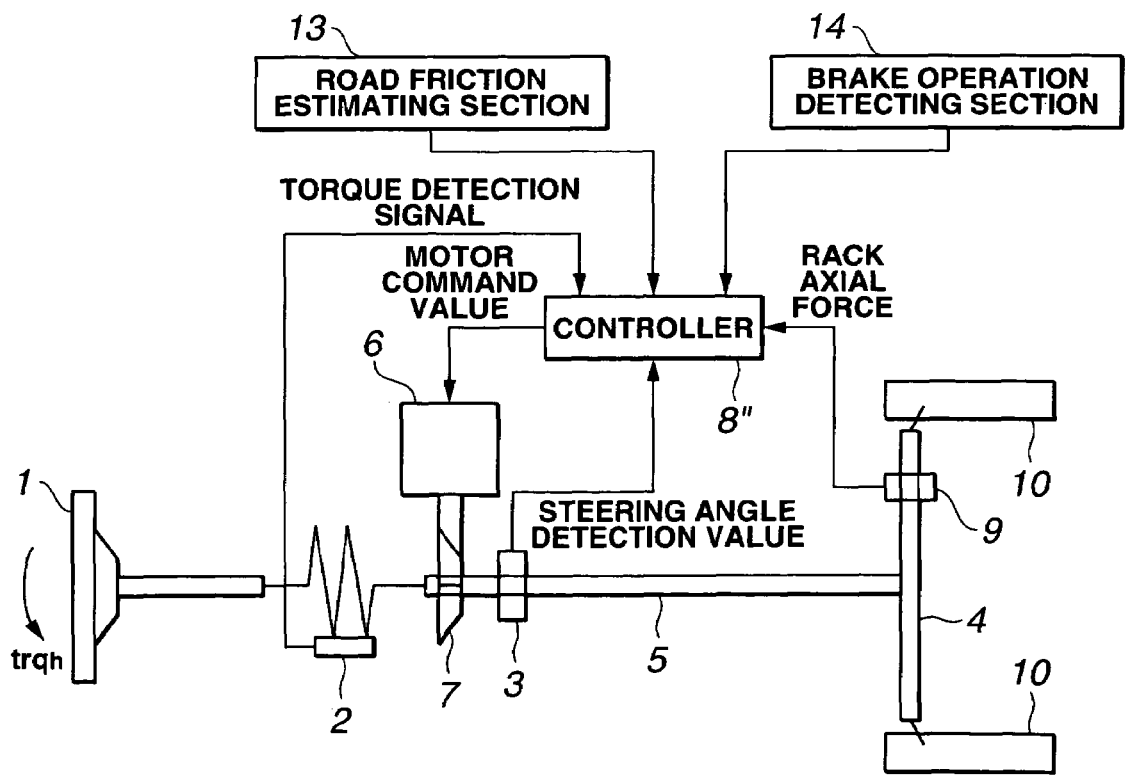
FIG. 12 is a structural view showing an electric power-steering apparatus according to a fourth embodiment of the present invention.

FIG. 12 is a whole structural view of the electric power steering system according to the fourth embodiment of the present invention. The electric power steering system specifically comprises a road friction estimating section 13 for estimating right and left side friction coefficients and a brake operation detecting section 14 for detecting an operation quantity of the braking, in addition to the construction of the first embodiment shown in FIG. 1. Since the other construction of the fourth embodiment is the same as that of the first embodiment, the same parts are denoted by the same reference numerals and the explanation thereof is omitted herein.

Figure 13:
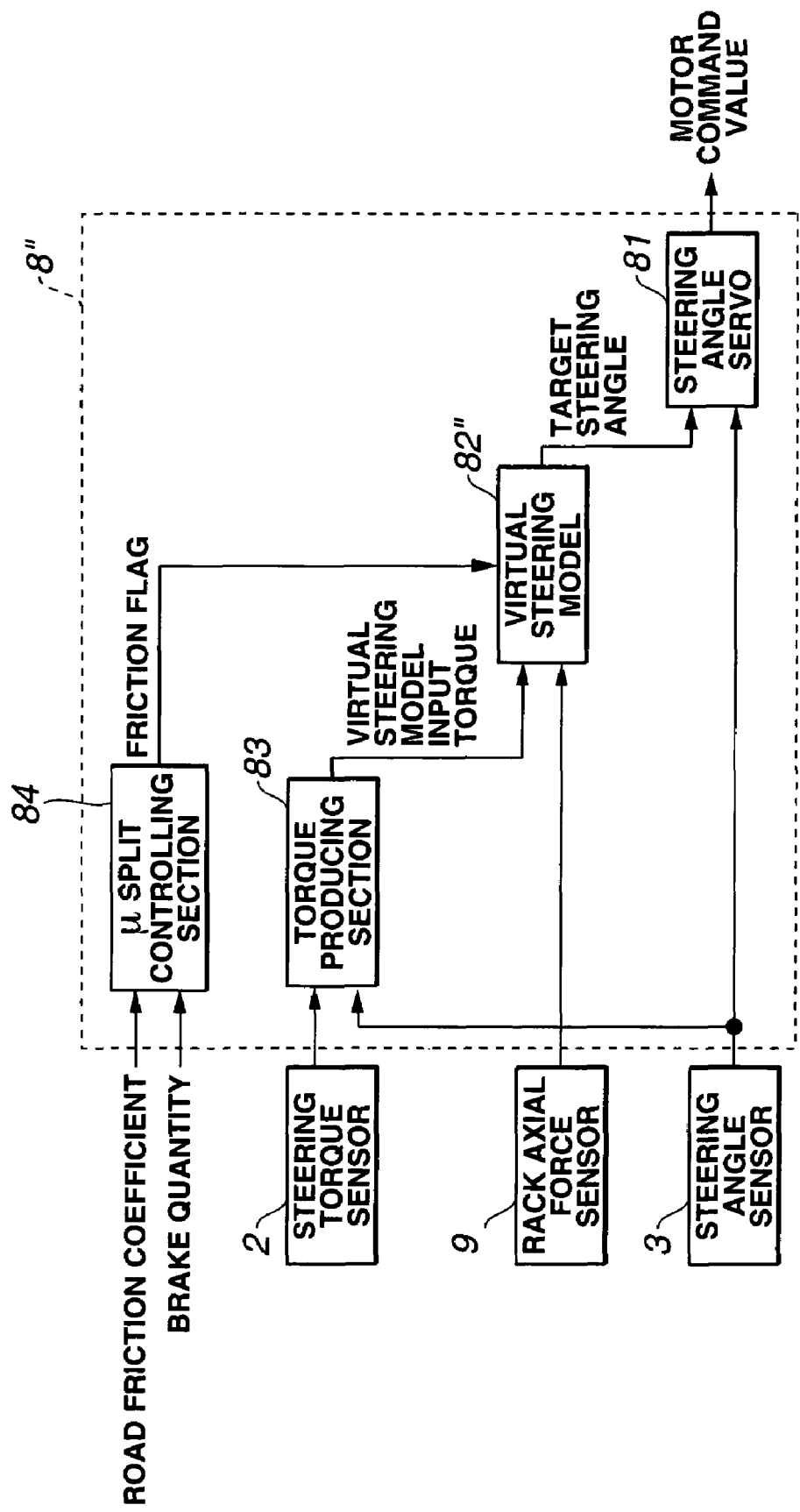
FIG. 13 is a control block diagram of the controller of the fourth embodiment.

FIG. 13 is a control block diagram of controller 8" of the fourth embodiment. Controller 8" of the fourth embodiment comprises a μ split controlling section 84. The μ split controlling section 84 receives the road friction coefficient and the braking quantity as input. When it is determined that a traveling road is a split μ road and the driver's steering torque is produced, the μ split controlling section 84 sets the friction flag at 1 ((friction flag)=1) and outputs the content of the friction flag to virtual steering model 82". When it is determined that the traveling road is not the split μ road or the driver's steering torque is not produced, the μ split control section 84 sets a friction flag at 0 ((friction flag)=0) and outputs the content of the friction flag to virtual steering model 82".

Figure 14:
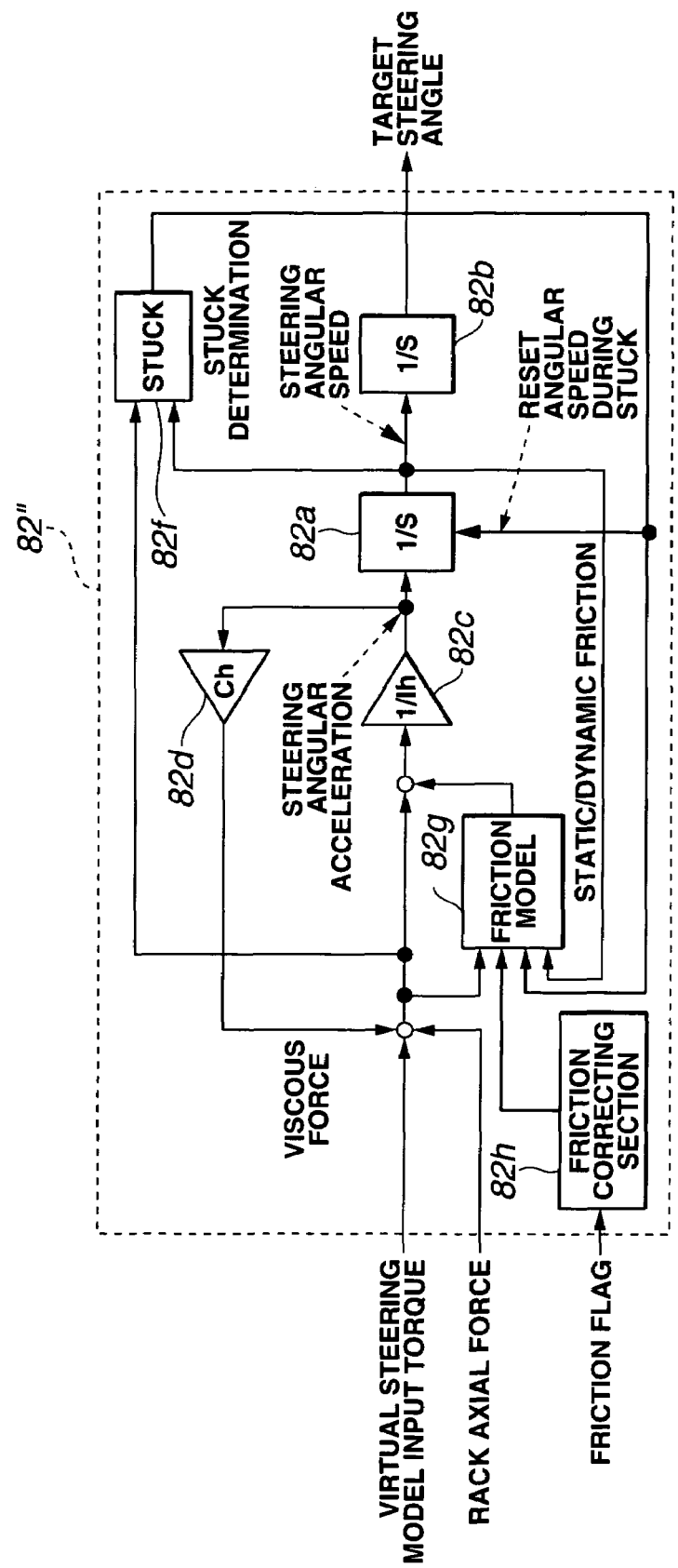
FIG. 14 is a control block diagram of the virtual steering model of the fourth embodiment.

FIG. 14 is a block diagram of virtual steering model 82" of the fourth embodiment, which employs a friction correcting section 82h and a friction model 82g instead of multiplier 82e shown in FIG. 3 of the first embodiment Friction model 82g receives the sum of the virtual steering model input torque, the rack axial force and the viscous force; a stuck determination of setting the steering angular speed at 0; and the friction correction quantity outputted form the friction correcting section 82h, as inputs. Friction model 82g outputs a friction torque to an adder disposed upstream of multiplier 82C. When the steering angular speed is 0, static friction torque is outputted. When the steering angular speed is not 0, dynamic friction torque is outputted.

Friction correcting portion 82h sets a friction correction quantity of correcting the friction torque, which is produced in the direction of preventing the steering operation toward the high-μ road side, at a larger value, when the friction flag is 1. Friction correcting portion 82h outputs the set friction correction quantity to friction model 82g.

Subsequently, there is discussed the manner of operation of the fourth embodiment.

[Friction Correcting control Processing]

Figure 15:
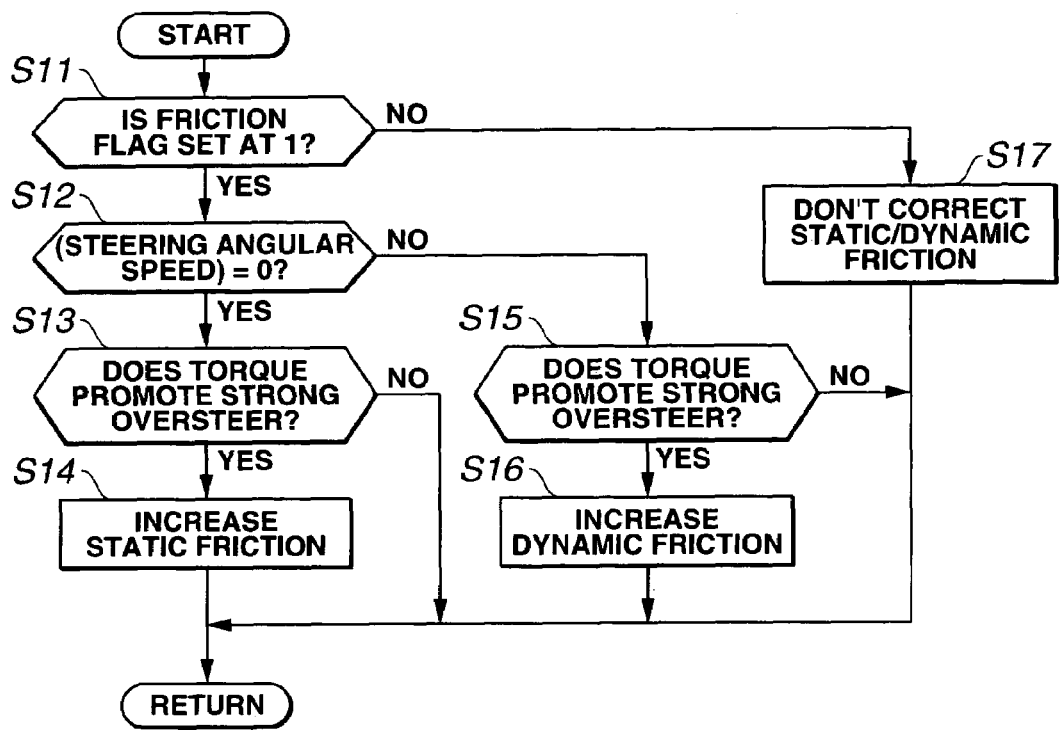
FIG. 15 is a flowchart showing a friction correcting control executed by a friction correcting section of the fourth embodiment.

FIG. 15 is a flowchart showing a friction correcting control executed by friction correcting section 82h of the fourth embodiment. Hereinafter, there is discussed each step in the flowchart.

At step S11, it is determined whether or not the friction flag is set at 1. When the determination at step S11 is affirmative, the routine proceeds to step S12. When the determination at step S11 is negative, the routine proceeds to step S17.

At step S12, it is determined whether or not the steering angular speed is 0 or not. When the determination at step S12 is affirmative, the routine proceeds to step S13. When the determination at step S12 is negative, the routine proceeds to step S15.

At step S13, it is determined whether or not the virtual steering model input torque promotes a strong over-steer. When the determination at step S13 is affirmative, the routine proceeds to step S14. When the determination at step S13 is negative, the routine proceeds to a return block for returning the routine to the start.

At step S14, a friction correction quantity for increasing the static friction is outputted to friction model 82h, and the routine then proceeds to the return block.

At step S15 subsequent to the negative determination at step S12, it is determined whether or not the direction of the steering angular speed is a direction of promoting the strong over-steer. When the determination at step S15 is affirmative, the routine proceeds to step S16. When the determination at step S15 is negative, the routine proceeds to the return block.

At step S16, the friction correction quantity of increasing the dynamic friction is outputted to friction model 82h, and the routine then proceeds to the return block.

At step S17 subsequent to the negative determination at step S11, no correction of the static/dynamic friction is executed, and the routine then proceeds to the return block.

That is, when the friction flag is 0, friction correcting section 82h does not execute the correction of the static/dynamic friction by the execution of steps S11 and S17. When the friction flag is 1, friction correcting section 82h determines whether or not the direction of the steering of virtual steering model 82" is a direction of promoting the strong over-steer, for example, the left side under a condition that the left side is a high-μ road. Further, friction correcting section 82h increases the static/dynamic friction by the execution of step S14 or S16 only when the direction of the steering of virtual steering model 82" is the direction of promoting the strong over-steer. Herein, when steering wheel 1 is put in a stop state that the steering angular speed is 0, the static friction is increased. When steering wheel 1 is in a steering state that the steering angular speed is not 0, the dynamic friction is increased.

[Friction-Increase Correcting Control]

In the fourth embodiment, the static/dynamic friction is increased as a predicted torque steer (=torque value) becomes large. It is possible to estimate a torque steer from the braking quantity and the right and left road friction coefficients. Since such a torque steer estimating procedure is commonly known in this art, the explanation thereof is omitted herein.

Figure 16:
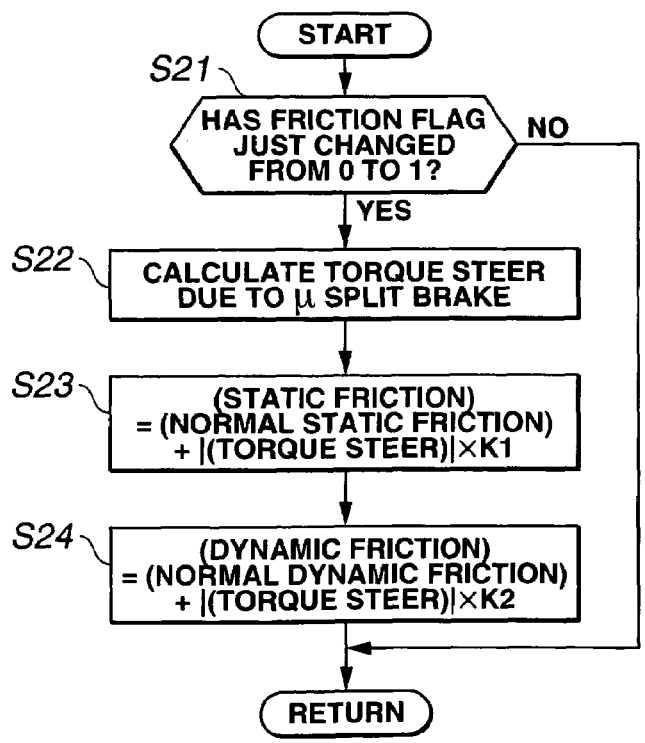
FIG. 16 is a flowchart showing a friction increment correcting control executed by the friction correcting section of the fourth embodiment.

FIG. 16 is a flowchart showing a friction increase correcting control executed by friction correcting section 82h of the fourth embodiment. Hereinafter, there is discussed each step executed in the flowchart of FIG. 16.

At step S21, it is determined whether or not the friction flag is changed from 0 to 1. When the determination at step S21 is affirmative, the routine proceeds to step S22. When the determination at step S21 is negative, the routine jumps to a return block of returning the present routine to a start block.

At step S22 subsequent to the affirmative determination at step S21, a torque steer due to the µ split brake is calculated. This step S22 corresponds to torque steer predicting means.

At step S23 subsequent to the execution of step S22, the static friction is calculated using the following expression.

(Static Friction)=(Normal Static Friction)+|(Torque Steer)|×K1 wherein K1 is a positive constant.

At step S24 subsequent to the execution of step S23, the dynamic friction is calculated using the following expression.

(Dynamic Friction)=(Normal Dynamic Friction)+| (Torque Steer)|×K2 wherein K2 is a positive constant.

The above-discussed correction processing is executed once when the braking is started on a split µ road. After the friction correcting control is started, the increased quantity is fixed until the present control is terminated. The correction of the friction may be executed relative to one of the static friction and the dynamic friction.

[Friction Flag Setting Control Processing]

Figure 17:
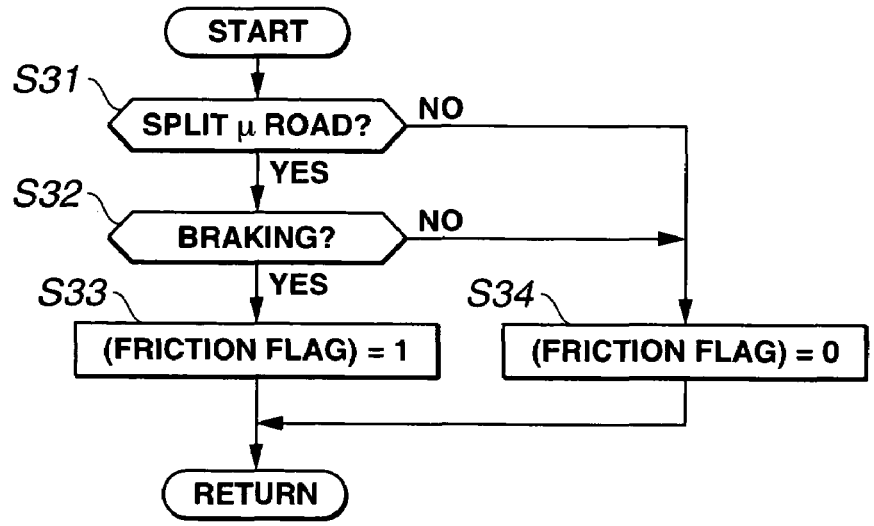
FIG. 17 is a flowchart showing a friction flag setting control executed by a split μ controlling section.

FIG. 17 is a flowchart showing a friction flag setting control processing executed by split µ road controlling section 84. Hereinafter there is discussed each step of the flowchart shown in FIG. 17.

At step S31, it is determined whether or not the traveling road is a split µ road. When the determination at step S31 is affirmative, the routine proceeds to step S32. When the determination at step S31 is negative, the routine proceeds to step S34. Herein, the determination as to a split µ road is executed such that when a difference between the right and left friction coefficients obtained from the road friction estimating section 13 is greater than a predetermined value, it is determined that the traveling road is a split µ road.

At step S32, it is determined whether or not a braking operation is being executed. This determination corresponds to brake operation detecting means. When the determination at step S32 is affirmative, the routine proceeds to step S33. When the determination at step S32 is negative, the routine proceeds to step S34. Herein, the determination as to the braking operation is determined such that when the brake pressure is greater than a predetermined brake pressure, brake operation detecting means 14 determines that the brake operation is being executed. If the predetermined brake pressure is set at a small value, the control becomes excessively delicate and tends to receive sensor noises. If the predetermined brake pressure is set at an excessively large value, the strong over-steer suppressing control is weakened or suppressed. Therefore, it is necessary to set the predetermined brake pressure upon taking account of the tradeoff of the above both characteristics.

At step S33, the friction flag is set at 1 ((friction flag)=1), and the routine is then returned.

At step S34, the friction flag is reset ((friction flag)=0), and the routine is then returned.

[Strong Over-Steer on Split µ Road]

There are shown a vehicular steering apparatus disclosed in Japanese Published Patent Application No. 2002-46638 and a steer-by-wire system disclosed in Japanese Published Patent Application No. (Heisei) 9-142330, as a technique for preventing a strong over-steer generated during a braking on a split µ road where road friction coefficient of right and left tires are different with each other.

Figure 18:
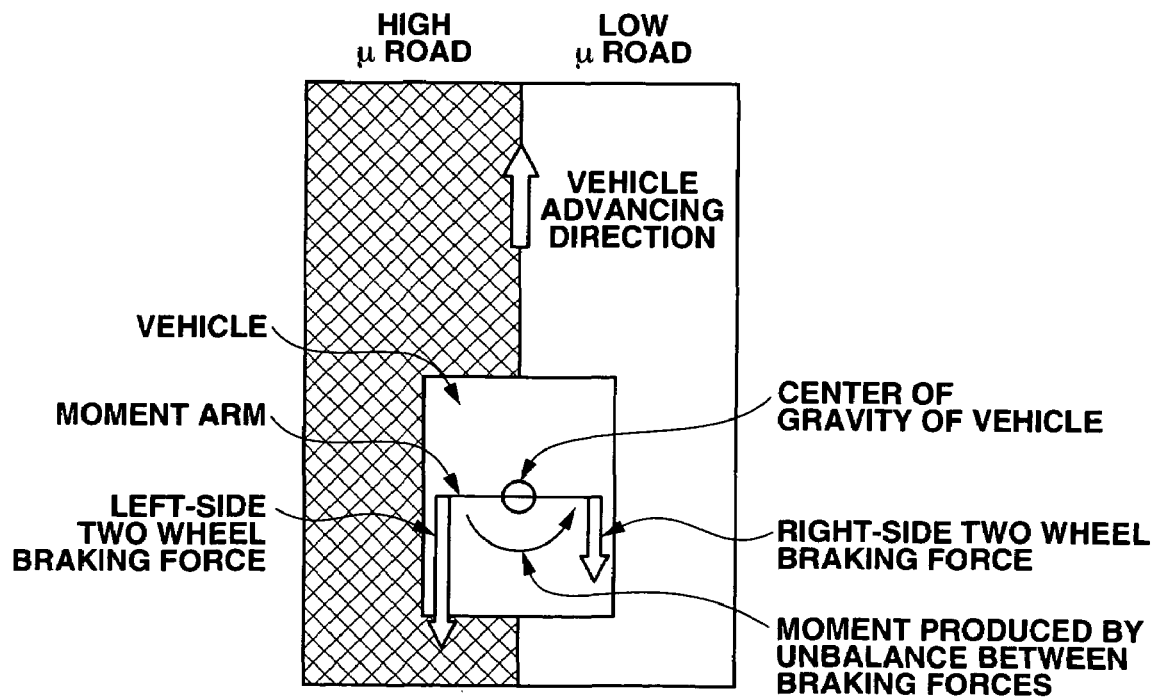
FIG. 18 is a view showing a generation principle of a difference between right and left braking forces on a split μ road.

There are main two reasons for generating a strong under-steer when a braking is executed on a split µ road. The first reason is that a moment is produced by a difference between right and left braking forces, as shown in FIG. 18. The moment increases as the difference between the right and left friction coefficients increases and as the braking force increases.

Figure 19:
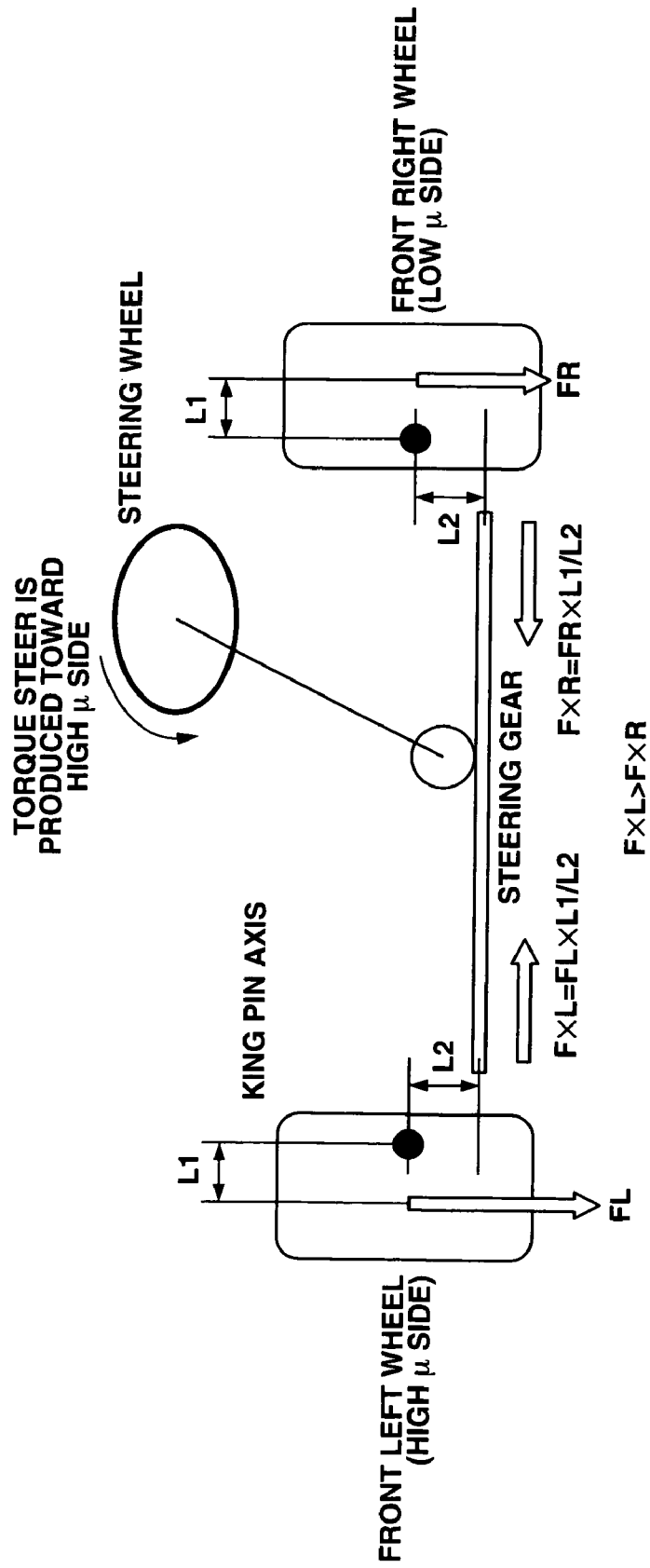
FIG. 19 is a view showing a generation principle of a torque steer on a split μ road.
Figure 20:
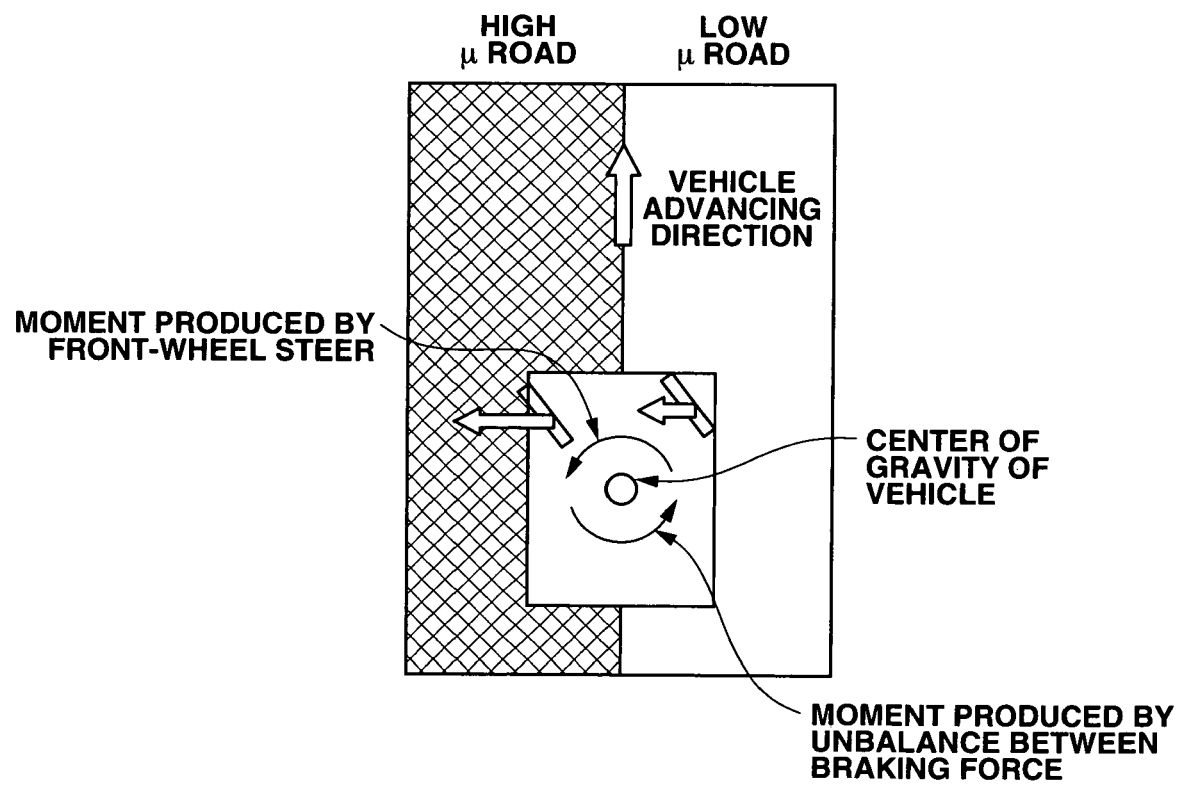
FIG. 20 is a view showing a generation principle of a front wheel lateral force on a split μ road.

The second reason is that a front wheel lateral force is caused by a steering wheel turn due to a torque steer as shown in FIG. 19. This force generates a moment of increasing the moment of the first reason.

The vehicular steering apparatus of Japanese Published Patent Application No. 2002-46638 is premised on the application of a power steering apparatus. When a strong over-steer tends to be generated during the braking on a split µ road, an actual yaw rate at a time immediately before the strong over-steer is generated is employed as a target yaw rate. Thereafter, an assist torque is controlled so that the actual yaw rate follows the target yaw rate until the strong over-steer is avoided. Since the vehicle follows the target yaw rate, it has been concluded that the strong over-steer is prevented.

On the other hand, the technique disclosed in Japanese Published Patent Application No. (Heisei) 9-142330 is premised on the application of a steer-by-wire system. That is, a steering wheel is mechanically separated from tires and is electrically connected to tires so that tires are steered to generate a yaw rate according to the steering-wheel angle. When a brake moment due to a split µ road is generated, an automatic counter steer is executed so as to cancel the brake moment.

[Problem of Prior Art]

The technique of Japanese Published Patent Application No. 2002-46638 has the following problem.

It is apparent that the assist torque for bringing the actual yaw rate to the target yaw rate is varied according to the vehicle motion state. Further, the vehicle motion state is varied according to a driver's steering operation. That is, the assist torque is varied according to the driver's steering operation. It is difficult to control such a controlled object whose characteristic is varied according to the driver's steering operation since it is hard for the driver to grasp the characteristic. Therefore, there is a possibility that the steering operation causes a hunting in some cases. Further, the driver's steering operation for generating other yaw rate is avoided by a control of bringing the actual yaw rate to the yaw rate at a time immediately before the strong over-steer is generated prevents.

On the other hand, since the technique disclosed in Japanese Published Patent Application No. (Heisei) 9-142330 is arranged to produce the automatic counter steer for canceling the moment to be eliminated, the lateral force is generated at the front wheels. Therefore, the vehicle starts a lateral motion due to the lateral force. That is, this known technique has a problem that a vehicle behavior, which is not intended by a driver, is generated.

[Strong Over-Steer Suppressing Operation by Steering Model Friction Correction]

Figure 21:
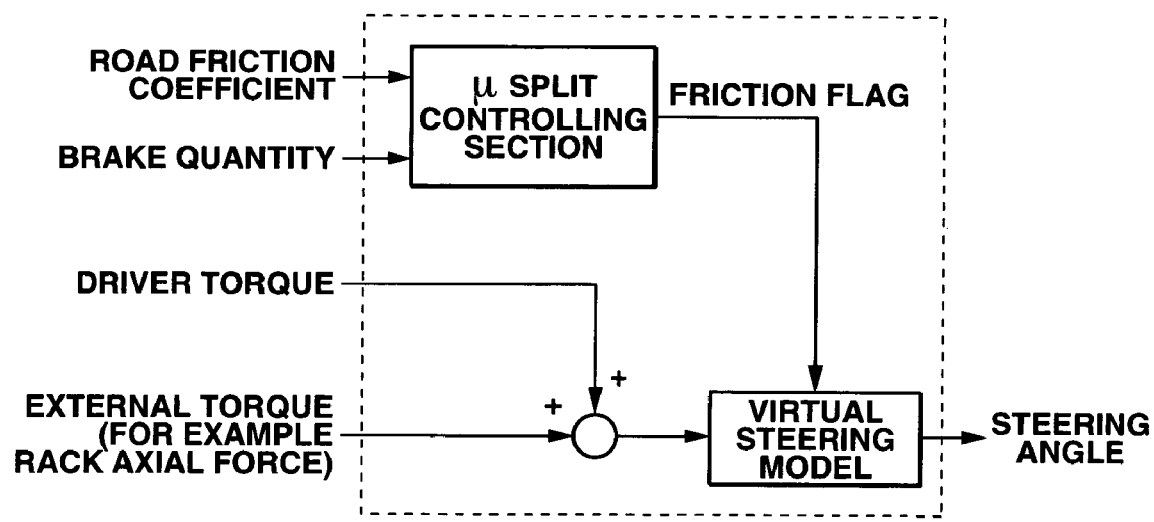
FIG. 21 is a schematic view showing an equivalent model of the fourth embodiment.

In contrast to the above discussed techniques, the fourth embodiment according to the present invention is arranged to set a margin of executing a counter steer for a driver by decreasing the steering quantity due to the torque steer generated immediately after the braking operation is started, and to suppress the strong over-steer by maintaining the drivability during the counter steer. Accordingly, employing the fourth embodiment, the driver can feel the reaction force of an equivalent model shown in FIG. 21 by the steering angle servo 81, the virtual steering model 82", and the torque producing section 83 shown in FIG. 13.

FIGS. 22A through 22E show a simulation result in case that the braking is executed on a split μ road. The conditions of this simulation is that the driver executed a braking operation at time 0 (ms), steering wheel 1 is put in a steering-wheel holding state, and the steering torque is not changed (kept constant).

From the simulation result shown in FIGS. 22A through 22E, it is understood that both of static and dynamic frictions during the control increase by 0.5 [Nm] in the direction of preventing a steering-wheel turn-increasing steering, as compared with the frictions during the non-control state, and therefore the steering quantity due to the torque steer was decreased. This decrease of the steering quantity due to the torque steer eliminates a part of the cause of the strong over-steer and decreases the magnitude of the strong over-steer. As a result, it becomes possible that a driver executes a counter-steer with a sufficient lead time.

[Driver's Intervention Allowing Function]

When the driver steered the steering wheel 1 in the direction of promoting a strong over-steer, an increased friction generates a force of preventing the steering operation. However, since the difference between the right and left turns of steering wheel 1 against the driver's steering torque is decreased, the system of the present invention obtains an effect of enabling a further easy steering operation. The total of the torques applied to steering wheel 1 at a strong over-steer promoting side and the total of the torques at a strong over-steer decreasing side are represented as follows.

(a) During Steering-Wheel Stop State:

At strong over-steer promoting side where a rotational torque in the promoting direction has a positive value, (total torque)=(driver torque)−(static friction)+|(torque steer)|−(static friction increment).

At strong over-steer decreasing side where a rotational torque in the decreasing direction has a positive value, (total torque)=(driver torque)−(static friction)−|(torque steer)|.

The difference between the right and left torques was decreased from (2×|(torque steer)|) during the non-control to (2×|(torque steer)|−(static friction increment), by the execution of the control.

(b) During Steering-Wheel Turning State:

At strong over-steer promoting side where a rotational torque in the promoting direction has a positive value, (total torque)=(driver torque)−(dynamic friction)+|(torque steer)|−(dynamic friction increment)

At strong over-steer decreasing side where a rotational torque in the decreasing direction has a positive value, (total torque)=(driver torque)−(dynamic friction)−|torque steer)|.

The difference between the right and left torques was decreased from (2×|(torque steer)|) during the non-control to (2×|(torque steer)|−(dynamic torque increment), by the execution of the control.

[Operation of Avoiding Interference Between Driver's Operation and Friction Correcting Control]

By executing the control of the fourth embodiment, the left and right static/dynamic frictions become different with each other, and the characteristic gained thereby becomes understandable by the driver. As a result, this prevents the generation of hunting due to mismatch between the driver and the control system. Since the friction force is constant regardless of the steering angular speed, the friction is not changed according to the steering. This complements the prevention of hunting. Further, the increment of the friction is kept constant during a period from the start of the control to the termination thereof. This simplifies the driver's grasp of the characteristic and functions to prevent the intervention between the driver and the control.

[Friction Increment Correcting Operation]

Although the increment of the friction is fixed during the control, it is possible to reinforce the effect thereof by correcting the magnitude of the increment of the friction. FIGS. 23A through 23E show a simulation result in case that the correction of the friction increment is executed, and clearly show the effect of the correction.

Figure 22A:
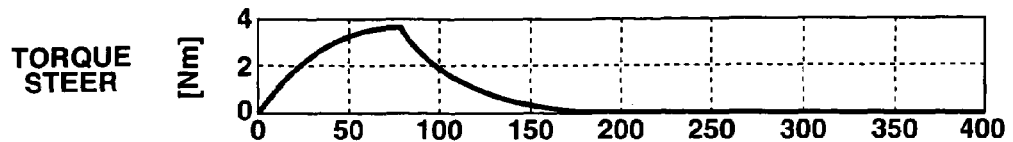
FIGS. 22A through 22E are graphs showing a simulation result for explaining a strong over-steer suppressing function of the fourth embodiment.
Figure 22B:
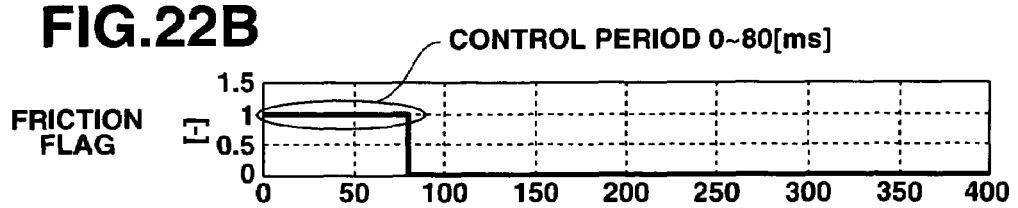
Figure 22C:
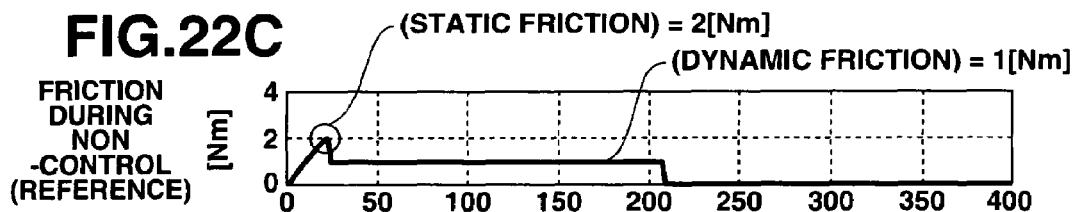
Figure 22D:
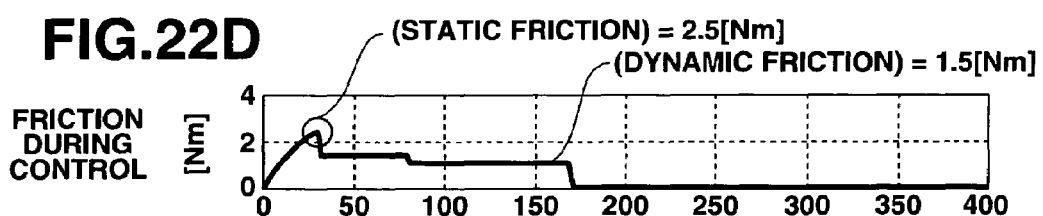
Figure 22E:
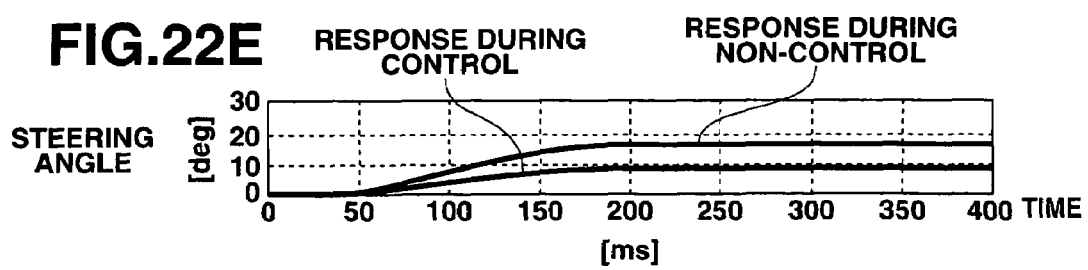
Figure 23A:
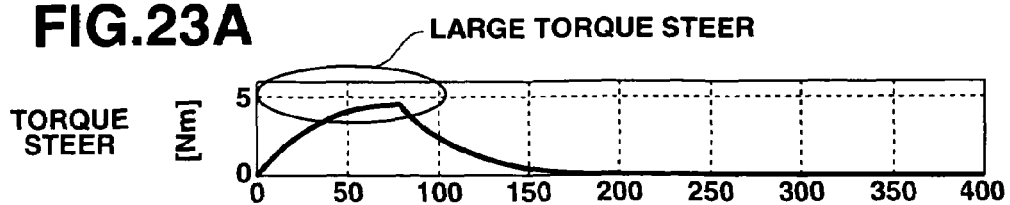
FIGS. 23A through 23E are graphs showing a simulation result for explaining a friction increment correcting function strong over-steer suppressing function according to the magnitude of the torque steer of the fourth embodiment.
Figure 23B:
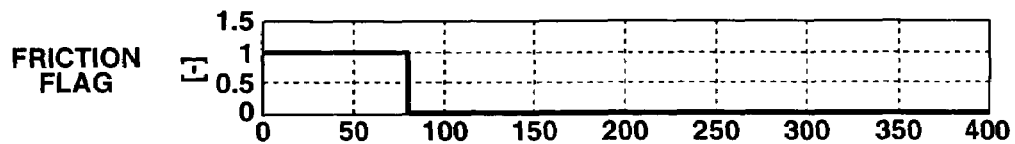
Figure 23C:
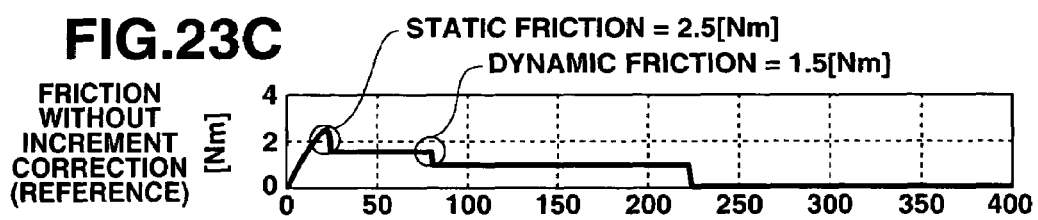
Figure 23D:
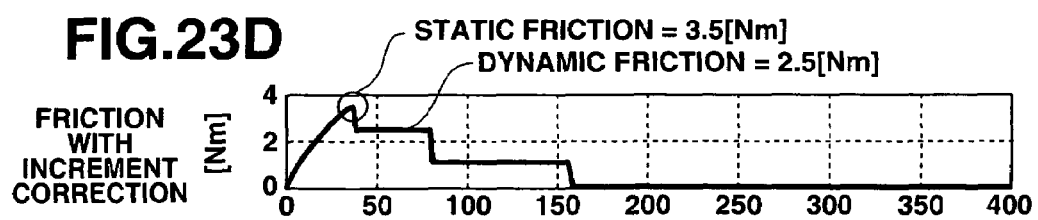
Figure 23E:
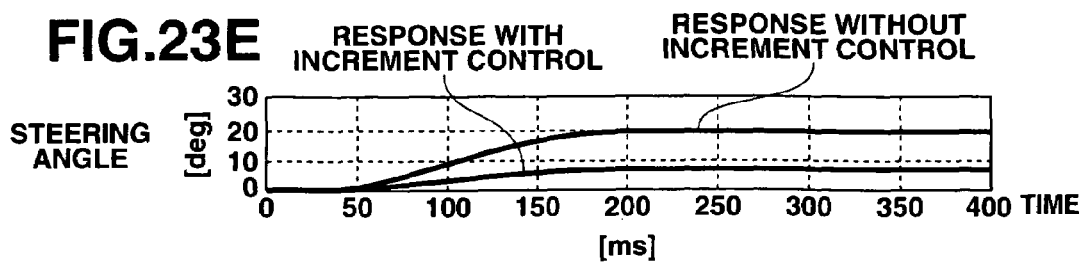

Although the torque steer largely increases as compared with the torque steer shown in FIG. 22A, it is possible to predict this increase of the torque steer from the brake quantity which corresponds to a different between the right and left braking forces. By increasing the increment correction quantity according to the torque steer predicted value, the steering quantity is decreased regardless of the magnitude of the torque steer.

[Control Response Improving Operation]

A brake system includes a delay factor. Inversely saying, it is possible to predict a torque steer due to the braking operation in advance of the actual steering. Since the friction correcting control does not generate the steering torque basically, it is possible to execute the friction correcting control immediately after the estimation of the torque steer. That is, since the control delay is not generated by itself, this effectively functions to decrease the steering quantity.

Subsequently, there is discussed the effect of the electric power steering system according to the fourth embodiment of the present invention. The electric power steering system of the fourth embodiment obtains the following effects in addition to the effects (1) through (5) of the first embodiment.

(9) The electric power steering system of the fourth embodiment is arranged to comprise the split μ road determining means (step S31) for determining the split μ road on which the road friction coefficients of the right side tire and the left side tire are different with each other, the braking operation detecting means (step S32) for detecting the driver's braking operation, and arranged such that the virtual steering model 82" comprises the friction model 82g for stimulatingly reproducing the friction of the steering system and adding the friction torque to the steering-wheel side torque, and the friction correction section 82h for correcting the friction torque directed in the direction of preventing the steering toward the high μ road side when it is determined that the traveling road is a high μ road and the driver's braking operation is detected. Therefore, it becomes possible to provide a margin (time) of applying a counter steer to a driver. Further, by preventing the degradation of the steer performance during the counter steer, the generation of the strong over steer is prevented.

(10) Since the static friction generated during the steering-wheel holding state and the dynamic friction generated during the steering-wheel turning state are employed as the friction of the control, it becomes possible to suppress the generation of the strong steer during the steering-wheel holding state and the steering-wheel turning state. Further, it becomes possible to achieve the friction change further approximated to the actual friction, which does not apply a strange feeling to the driver.

(11) Since the fourth embodiment is arranged to comprise the torque steer predicting means (step S22) for estimating the magnitude of the torque steer generated by the difference between the right and left braking forces and arranged such that the friction correcting section 82h increases the increase degree of the friction torque as the estimated value of the torque steer increases (steps S23 and S24). Therefore, it is possible to decrease the steering quantity regardless of the magnitude of the steering torque.

(12) Since the friction correcting section 82h maintains the once increased value, the friction increment is not changed until the friction correcting control is cancelled. This facilitates the driver's grasp as to the steering characteristic, and as a result the intervention between the driver and the friction correcting control is prevented.

Although the preferred embodiments of carrying out the present invention have been discussed based on the first through fourth embodiments, a concrete construction of the invention is not limited by each embodiment, and the invention includes the change of the design of the construction within the sprit and sprit of the invention.

For example, it may be constructed such that the motor directly applies the steering torque to the steering column shaft without providing the reduction gear between the motor and the steering column shaft. Further, as means for detecting an external input of the steering column shaft, a yaw rate sensor and a lateral acceleration sensor may be provided in addition to the rack axial force sensor.

Although each embodiment of the present invention has been shown and described such that the drive control of the motor is executed using the current command value calculated from the target steering angle, the driving control of the motor may be executed by calculating a voltage command value from the target steering angle and using the obtained voltage command value. In case that such a control is employed, the controller directly energizes the motor without a driver's intervention.

Figure 24:
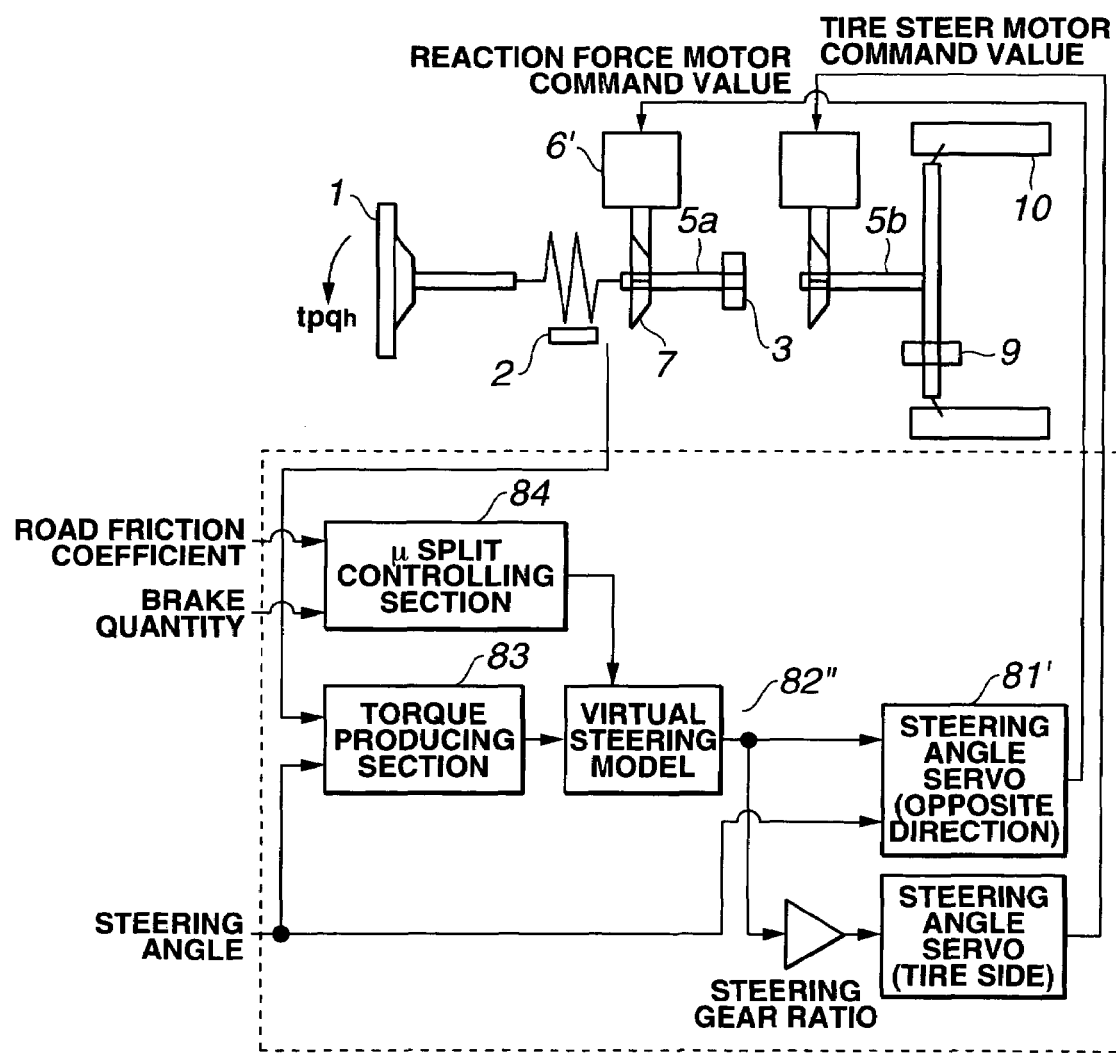
FIG. 24 is a schematic view showing a design object of a steering angle serve in case that the invention is applied to a steer-by-wire system.

Although the fourth embodiment has been shown and described on the assumption that a power steering system is employed as a hardwire, it may be adapted to a steer-by-wire system shown in FIG. 24. In such a case, the effects as same as those of the fourth embodiment are obtained.

This application is based on Japanese Patent Applications No. 2004-311641 filed on Oct. 27, 2004 and No. 2005-227328 filed on Aug. 5, 2005 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A vehicle steering apparatus comprising:
   an actuator for applying an axial torque to a steering column shaft;
   a torque sensor disposed on the steering column shaft between an input portion of the actuator and a steering wheel, the torque sensor configured to detect a steering torque;
   a turn angle sensor for detecting a turn angle of the steering column shaft; and
   a controller connected for signal communication with the actuator, the torque sensor and the turn angle sensor, and confirgured to:
   calculate an additional steering torque at least in accordance with the detected turn angle;
   calculate a steering wheel side torque as a sum of the detected steering torque and the additional steering torque, wherein the steering wheel side torque is defined as a torque applied to the steering wheel;
   determine a target turn angle of the steering column shaft in accordance with the steering wheel side torque by using a steering model that represents a desired steering characteristic; and
   control the axial torque of the actuator so as to allow the detected turn angle of the steering column shaft to follow the target turn angle.

2. The vehicle steering apparatus as claimed in claim 1, wherein the controller is further configured to:
   calculate a steering wheel turn angle as a sum of the detected turn angle and a torsional angle estimated from the detected steering torque; and
   calculate the additional steering torque as a sum of a product of a first order differential of the steering wheel turn angle and a torsional damping coefficient, and a product of a second order differential of the steering wheel turn angle and a steering wheel inertia.

3. The vehicle steering apparatus as claimed in claim 1, wherein the controller is further configured to determine the target turn angle in accordance with an external input which is applied to the steering column shaft when the steering wheel side torque is applied.

4. The vehicle steering apparatus as claimed in claim 3, wherein the controller is further configured to calculate a steering inertia, a steering viscosity, a steering static friction and a steering dynamic friction, and determine the target turn angle in accordance with the steering inertia, the steering viscosity, the steering static friction and the steering dynamic friction.

5. The vehicle steering apparatus as claimed in claim 1, wherein the steering column shaft is mechanically connected to a steering mechanism for steering steered wheels, and the actuator is an assist actuator for assisting a driver's steering force.

6. The vehicle steering apparatus as claimed in claim 1, wherein the steering column shaft is mechanically separated from a steering mechanism for steering steered wheels, and the actuator is a reaction force actuator for outputting a steering reaction force which corresponds to a road input.

7. The vehicle steering apparatus as claimed in claim 1, wherein the controller is further configured to determine whether a traveling road is a split μroad which is a road wherein road friction coefficients of right and left tires are different from each other, and detect a driver's braking operation,
   wherein the controller is further configured to reproduce a friction of a steering system, apply a friction torque corresponding to the reproduced friction to the steering wheel side torque, and correct a friction torque directed in a direction of preventing the steering toward a high μroad side to a larger value when the traveling road is the split μroad and the driver's braking operation is detected.

8. The vehicle steering apparatus as claimed in claim 7, wherein the friction is at least one of a static friction generated during a steering wheel stop state and a dynamic friction generated during a steering wheel turning state.

9. The vehicle steering apparatus as claimed in claim 7, wherein the controller is further configured to predict a magnitude of a torque steer generated due to a difference between right and left braking forces,
   wherein the controller is further configured to increase the friction torque corresponding to the reproduced friction according to the magnitude of the torque steer predicted value, immediately after the driver's braking operation is started.

10. The vehicle steering apparatus as claimed in claim 9, wherein the controller is further configured to maintain the increased friction torque.

11. The vehicle steering apparatus as claimed in claim 1, wherein the controller is further configured to:
calculate a steering wheel turn angle as a sum of the detected turn angle and a torsional angle estimated from the detected steering torque; and
calculate the additional steering torque as a product of a second order differential of the steering wheel turn angle and a steering wheel inertia.

12. The vehicle steering apparatus as claimed in claim 1, wherein the controller is further configured to calculate the additional steering torque at least in accordance with the detected turn angle and a steering wheel inertia.

13. A vehicle steering apparatus comprising:
an actuator for applying an axial torque to a steering column shaft;
a torque sensor disposed on the steering column shaft between an input portion of the actuator and a steering wheel, the torque sensor configured to detect a steering torque;
a turn angle sensor for detecting a turn angle of the steering column shaft; and
a controller connected for signal communication with the actuator, the torque sensor and the turn angle sensor, and configured to:
estimate a steering wheel side torque applied to the steering wheel from the detected steering torque and the detected turn angle;
receive the steering wheel side torque as an input and output a target turn angle of the steering column shaft, by using a steering model that represents a desired steering characteristic; and
control an output of the actuator so that the detected turn angle of the steering column shaft follows the target turn angle,
wherein the controller is configured to obtain a steering wheel turn angle which is a sum of the detected turn angle and a torsional angle estimated from the detected steering torque, and sets a sum of the detected steering torque and a product of a second order differential of the steering wheel turn angle and a steering wheel inertia, as the steering wheel side torque.

14. A vehicle steering apparatus comprising:
actuating means for applying an axial torque to a steering column shaft;
means for detecting a steering torque on the steering column shaft between an input portion of the actuating means and a steering wheel;
means for detecting a turn angle of the steering column shaft; and
means for:
calculating an additional steering torque at least in accordance with the detected turn angle;
calculating a steering wheel side torque as a sum of the detected steering torque and the additional steering torque, wherein the steering wheel side torque is difined as a torque applied to the steering wheel;
determining a target turn angle of the steering column shaft in accordance with the steering wheel side torque by using a steering model that represents a desired steering characteristic; and
controlling the axial torque of the actuating means so as to allow the detected turn angle of the steering column shaft to follow the target turn angle.

15. The vehicle steering apparatus as claimed in claim 14, wherein the calculating of the additional steering torque is implemented by calculating the additional steering torque at least in accordance with the detected turn angle and a steering wheel inertia.

16. The vehicle comprising:
an actuator for applying an axial torque to a steering column shaft;
a torque sensor disposed on the steering column shaft between an input portion of the actuator and a steering wheel, the torque sensor configured to detect a steering torque;
a turn angle sensor for detecting a turn angle of the steering column shaft; and
a controller connected for signal communication with the actuator, the torque sensor and the turn angle sensor, and configured to:
calculate an additional steering torque at least in accordance with the detected turn angle;
calculate a steering wheel side torque as a sum of the detected steering torwue and the additional steering torque, wherein the steering wheel side torque is defined as a torque applied to the steering wheel;
determine a target turn angle of the steering column shaft in accordance with the steering wheel side torque by using a steering model that represents a desired steering characteristic; and
control the axial torque of the actuator so as to allow the detected turn angle of the steering column shaft to follow the target turn angle.

17. The vehicle as claimed in claim 16, wherein the controller is further configured to calculate the additional steering torque at least in accordance with the detected turn angle and a steering wheel inertia.

18. A vehicle steering apparatus comprising:
an actuator for applying an axial torque to a steering column shaft;
a torque sensor disposed on the steering column shaft between an input portion of the actuator and a steering wheel, the torque sensor configured to detect a steering torque;
a turn angle sensor for detecting a turn angle of the steering column shaft; and
a controller connected for signal communication with the actuator, the torque sensor and the turn angle sensor, and configured to:
estimate a steering wheel side torque applied to the steering wheel from the detected steering torque and the detected turn angle;
receive the steering wheel side torque as an input and output a target turn angle of the steering column shaft, by using a steering model that represents a desired steering characteristic; and
control an output of the actuator so that the detected turn angle of the steering column shaft follows the target turn angle,
wherein the controller is further configured to determine the target turn angle in accordance with an external input which is applied to the steering column shaft when the steering wheel side torque is applied,
wherein the controller is further configured to assume a steering inertia, a steering viscosity, a steering static friction and a steering dynamic friction,and determine the target turn angle in accordance with the steering inertia, the steering viscosity, the steering static friction and the steering dynamic friction.

19. A vehicle steering apparatus comprising:

an actuator for applying an axial torque to a steering column shaft;

a torque sensor disposed on the steering column shaft between an input portion of the actuator and a steering wheel, the torque sensor configured to detect a steering torque;

a turn angle sensor for detecting a turn angle of the steering column shaft; and a controller connected for signal communication with the actuator, the torque sensor and the turn angle sensor, and configured to:

estimate a steering wheel side torque applied to the steering wheel from the detected steering torque and the detected turn angle;

receive the steering wheel side torque as an input and output a target turn angle of the steering column shaft, by using a steering model that represents a desired steering characteristic; and control an output of the actuator so that the detected turn angle of the steering column shaft follows the target turn angle, wherein the steering column shaft is mechanically connected to a steering mechanism for steering steered wheels, and the actuator is an assist acuator for assisting a driver's steering force.

* * * * *